(12) United States Patent
Rohn et al.

(10) Patent No.: US 9,663,062 B2
(45) Date of Patent: May 30, 2017

(54) AIRBAGS INCLUDING INTERNAL TETHERS AND METHODS OF FORMING THE SAME

(71) Applicant: AUTOLIV ASP, INC., Ogden, UT (US)

(72) Inventors: Michael Rohn, Ortonville, MI (US); Dana Wold, Farmington Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/885,842

(22) Filed: Oct. 16, 2015

(65) Prior Publication Data

US 2017/0106830 A1    Apr. 20, 2017

(51) Int. Cl.
  *B60R 21/2338* (2011.01)
  *B60R 21/235* (2006.01)
  *B60R 21/232* (2011.01)

(52) U.S. Cl.
  CPC ........ *B60R 21/2338* (2013.01); *B60R 21/232* (2013.01); *B60R 21/235* (2013.01); *B60R 2021/23384* (2013.01); *B60R 2021/23509* (2013.01); *B60R 2021/23547* (2013.01)

(58) Field of Classification Search
  CPC . B60R 21/2338; B60R 21/232; B60R 21/235; B60R 2021/23509; B60R 2021/23384; B60R 2021/23547
  See application file for complete search history.

(56) References Cited

U.S. PATENT DOCUMENTS

| 5,768,875 | A | 6/1998 | Bergen |
| 2004/0188988 | A1* | 9/2004 | Wipasuramonton .. B60R 21/214 280/730.1 |
| 2005/0082807 | A1 | 4/2005 | Kwon |
| 2005/0140125 | A1* | 6/2005 | Noguchi ............... B60R 21/232 280/730.2 |
| 2007/0046001 | A1* | 3/2007 | Hirata ................... B60R 21/232 280/730.2 |
| 2007/0200329 | A1 | 8/2007 | Ma |
| 2008/0084052 | A1* | 4/2008 | Abney ................. B60R 21/232 280/730.2 |
| 2011/0057425 | A1* | 3/2011 | Fink ..................... B60R 21/232 280/730.2 |
| 2012/0280478 | A1* | 11/2012 | Fink ..................... B60R 21/232 280/743.1 |

FOREIGN PATENT DOCUMENTS

| DE | 19843456 A1 | 4/1999 |
| DE | 20015134 U1 | 1/2001 |
| EP | 2407353 B | 3/2013 |
| GB | 2316370 A | 2/1998 |
| WO | 0144547 A2 | 6/2001 |

\* cited by examiner

*Primary Examiner* — Drew Brown
(74) *Attorney, Agent, or Firm* — Stoel Rives LLP

(57) ABSTRACT

Airbags including tethered inflatable chambers are disclosed. The tethered inflatable chambers can include internal tethers that are configured to break when an internal pressure of a tethered inflatable chamber reaches a predetermined value. Methods of forming an airbag fabric including internal tethers are also disclosed.

22 Claims, 16 Drawing Sheets

AIRBAGS INCLUDING INTERNAL TETHERS AND METHODS OF FORMING THE SAME

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
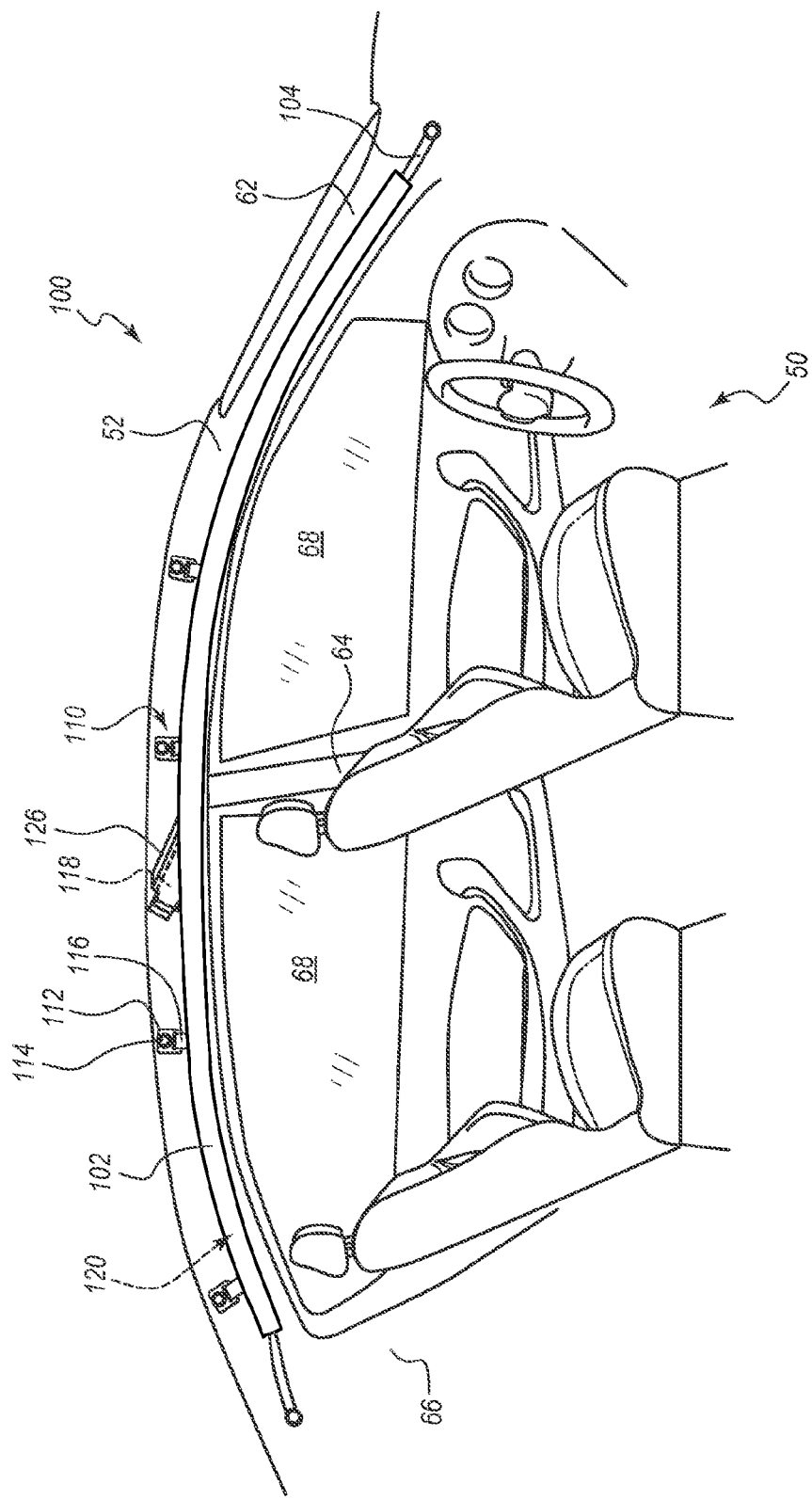
FIG. 1A is a side elevation view of an inflatable curtain airbag assembly, according to one embodiment of the present disclosure, in a packaged state within a vehicle.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize vehicle occupant injury during collision events. Airbag modules have been installed at various locations within a vehicle, including, but not limited to, within the steering wheel, within the dashboard and/or instrument panel, within the side doors or side seats, adjacent to a roof rail of the vehicle, in an overhead position, or at the knee or leg position. In the following disclosure, "airbag" generally refers to an inflatable curtain airbag or cushion, although the principles discussed may apply to other types of airbags (e.g., driver airbags and knee airbags).

Inflatable curtain airbags typically extend longitudinally within the vehicle and are usually coupled to or next to the roof rail of the vehicle. In a packaged state or an undeployed state, inflatable curtain cushions are typically rolled and/or folded, and may be retained in the packaged configuration or the undeployed configuration by being wrapped in a restraint at various attachment points at which the inflatable airbag is attached to the vehicle, or by being enclosed in a restraint, such as a sleeve or a sock. In a deployed state or an unpackaged state, an inflatable curtain cushion may expand and burst free from the restraint to cover at least a portion of the side windows and one or more pillars of the vehicle. In some embodiments, inflatable curtain cushions may cover one or more of the A-, B-, C-, and D-pillars of a vehicle. For example, in some embodiments, the inflated curtain airbag may extend from the A-pillar to the C-pillar of the vehicle. In other embodiments, a deployed inflatable curtain cushion may extend from the A-pillar to the D-pillar of the vehicle.

In a collision event, the inflatable curtain cushion may be inflated by an inflator and change conformation from being rolled and/or folded in the packaged state to being extended and/or inflated in the deployed state. In some arrangements, the amount of gas from the inflator that is retained within the inflatable curtain determines how hard or soft the cushioning of the curtain will be or how hard or soft portions of the curtain will be. Other factors may also affect the cushioning abilities of the inflatable curtain airbag.

Some inflatable curtain cushions may be configured to serve dual functions of cushioning and ejection prevention. During a collision event, the curtain may cushion the head and upper body of an occupant, and during a roll-over event, the cushion may function to help retain the occupant within the vehicle. Inflatable curtain cushions help mitigate the risk of occupant ejection by forming a barrier between the occupant and the side windows.

Some inflatable airbags have a throat portion that is in fluid communication with an inflator. The inflator may be configured to generate inflation gas in response to predetermined conditions. The inflatable airbag may include one or more voids or chambers for receiving the inflation gas. A gas guide may be positioned in the void of the inflatable airbag at or adjacent the throat portion. In some instances the gas guide may extend beyond the throat portion. Gas guides of any dimensions and disposed at any position within the void of the throat portion and/or the inflatable airbag are within the scope of this disclosure. A gas guide may be a textile gas guide constructed or made from a textile material, which may include, but is not limited to, coated, uncoated, woven, unwoven, synthetic, or natural fabric, film, or other suitable fabric or fabric-like material.

In some embodiments, the gas guide may be made of the same material as the throat portion and/or the inflatable cushion. In other embodiments, the gas guide may be made of a different material than the throat portion and/or the inflatable cushion. The materials may have different strengths, melting temperatures, and/or other relevant properties.

In some embodiments, the gas guides disclosed herein may deliver or guide inflation gas, or be configured to deliver or guide inflation gas, in a controlled or delayed manner from the inflator into one or more chambers or segments of the airbag. Such controlled or delayed direction of the inflation gas into the inflatable cushion segments may soften the deployment of the inflatable airbag and/or the cushioning provided by the deployed inflatable airbag. Inflatable curtain airbags with varying timing of inflation of different portions or segments of the airbag may be desirable. Likewise, inflatable curtain airbags with varying levels of hardness in different portions or segments of the airbag during deployment and/or upon deployment may also be desirable.

As used herein, the terms "proximal" and "distal" refer to proximity to the inflator and/or direction of inflation gas flow during deployment, where more proximally oriented features are closer to the inflator and/or contact inflation gases sooner than do more distally oriented features.

Figure 1B:
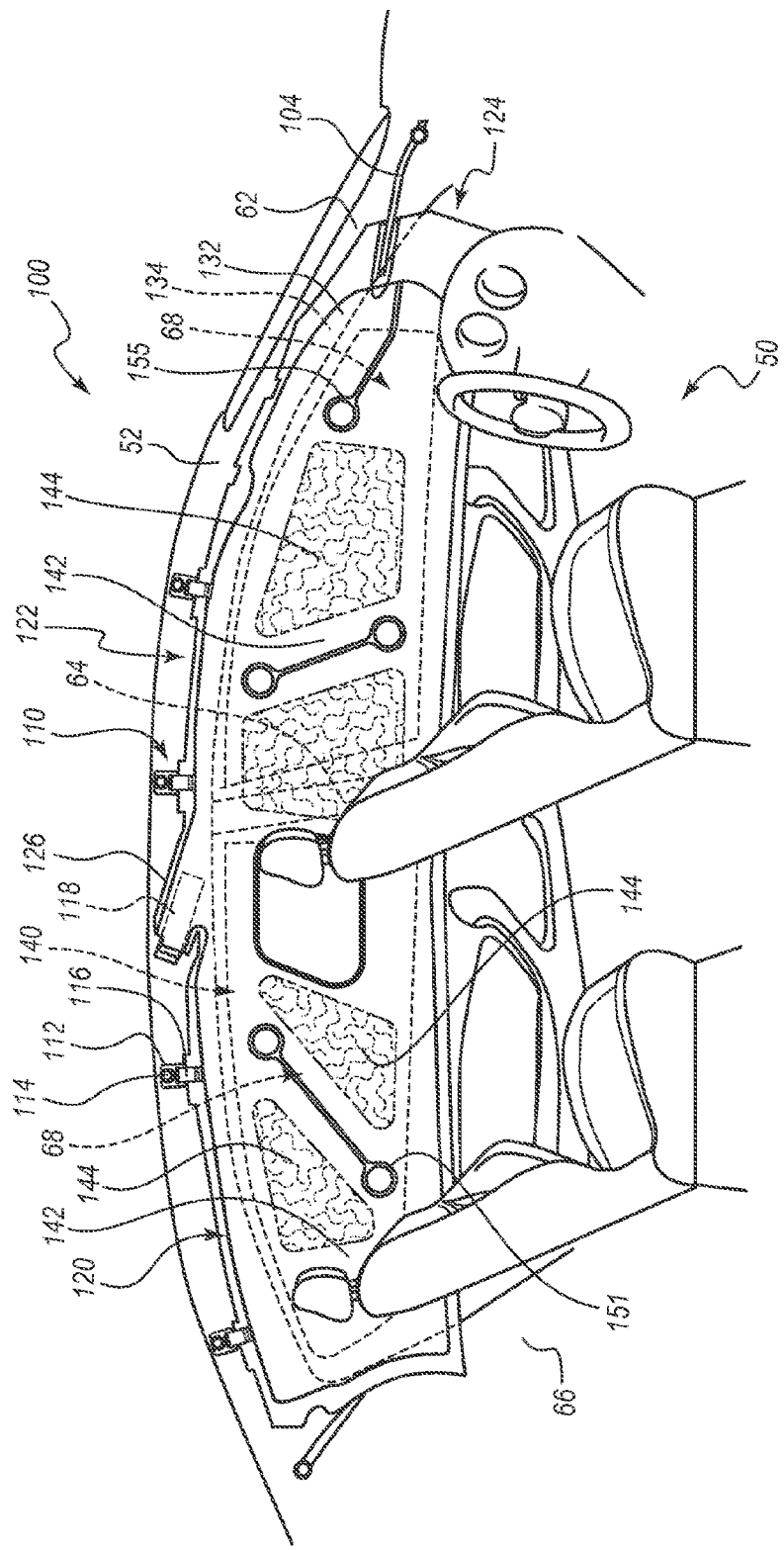
FIG. 1B is a side elevation view of the inflatable curtain airbag assembly of FIG. 1A in a deployed state.

FIGS. 1A and 1B depict an embodiment of an inflatable curtain airbag assembly 100 mounted within a vehicle 50. In FIG. 1A, the assembly 100 is in a packaged configuration, whereas in FIG. 1B, the assembly 100 is in a deployed configuration.

The assembly 100 can include an inflatable curtain airbag 120, which can be secured to the vehicle 50 in any suitable manner. The inflatable curtain airbag 120 may also be referred to herein as a cushion or as an airbag. In the illustrated embodiment of FIG. 1A, the inflatable curtain airbag 120 is positioned at an interior of a restraint 102 so as to be retained in a packaged configuration. The restraint 102 may be of any suitable variety, such as one or more straps, tethers, socks, or sleeves. In the illustrated embodiment, the restraint 102 includes a sleeve that extends along substantially a full length of the inflatable curtain airbag 120, such that a majority of the inflatable curtain airbag 120 is obscured from view by the sleeve.

As stated above, the assembly 100 can be attached to the vehicle 50 in any suitable manner. For example, in some embodiments, the assembly 100 includes one or more fastening assemblies 110 that are configured to secure one or more of the inflatable curtain airbag 120 and the restraint 102 to the vehicle 50. The assembly 100 can be mounted inside the vehicle 50 adjacent to a roof of the vehicle 50, such as to a roof rail 52. In the illustrated embodiment, each fastening assembly 110 includes a tether or strap 116 that is secured to mounting hardware, such as a tab 112 that is secured to the roof rail 52 via a fastener 114, such as a bolt. Each strap 116 may be coupled with one or more of the inflatable curtain airbag 120 and the restraint 102 in any suitable manner. Any other suitable fastening arrangement is also within the scope of this disclosure.

A forward end of the assembly 100 can include a strap 104, which may be secured to the vehicle 50 in any suitable manner. For example, in the illustrated embodiment, the strap 104 is attached to a lower end of an A-pillar 62. As shown in FIG. 1B, the strap 104 can be attached to a forward end 124 of the inflatable curtain airbag 120. An upper end 122 of the inflatable curtain airbag 120 can be attached to the straps 116. In some embodiments, the straps 116 are sewn to the inflatable curtain airbag 120. In other embodiments, the straps 116 may be integrally formed with the inflatable curtain airbag 120, and may extend from one or more panels of the inflatable curtain airbag 120.

With reference to FIGS. 1A and 1B, the assembly 100 can further include an inflator 118, which may be positioned within and/or coupled to a throat portion 126 of the inflatable curtain airbag 120. The inflator 118 can be anchored to the roof rail 52, and may be of any suitable variety. As depicted, the inflator 118 is anchored to the vehicle 50 rearward of a B-pillar 64, forming a "mid-fill" configuration. In some embodiments, an inflator may be anchored to the vehicle 50 adjacent the A-pillar 62 or adjacent a C-pillar 66, forming an "end-fill" configuration. The inflator 118 can include any typical inflator device, including either a pyrotechnic device or a stored gas inflator. The inflator 118 may also include a single-stage inflator or a multiple-stage inflator. In certain embodiments, the inflator 118 can be in electronic communication with vehicle sensors which are configured to detect vehicle collisions and/or rollovers. Upon detection of predetermined conditions, the sensors can activate the inflator 118, and the inflatable curtain airbag 120 may be inflated or rapidly inflated. Other configurations of the inflator 118 are also within the scope of this disclosure.

With continued reference to FIGS. 1A and 1B, the inflatable curtain airbag 120 can be configured to cover various structures of the vehicle 50 when deployed. For example, in some embodiments, at least a portion of the deployed inflatable curtain airbag 120 can cover one or more of the A-pillar 62, the B-pillar 64, and the C-pillar 66, and/or one or more side windows 68. The illustrated embodiment is configured to cover at least a portion of the B-pillar 64 and at least portions of each of the side windows 68.

With reference to FIG. 1B, the inflatable curtain airbag 120 can define various portions that direct or guide inflation gas during deployment of the inflatable curtain airbag 120 and/or that provide different amounts of cushioning relative to the vehicle structures upon deployment of the inflatable curtain airbag 120. In particular, the inflatable curtain airbag 120 can include various inflatable chambers, cells, or cushion segments that are configured to be filled with inflation gases in order to cushion a vehicle occupant during a collision event. The illustrated embodiment includes a plurality of inflatable chambers or inflatable cushion segments 142 that are in fluid communication with an inflation gas delivery channel 140. The inflatable chambers 142 can be configured to deploy at strategic areas at which a vehicle occupant may benefit from the cushioning. The illustrated embodiment also includes a plurality of tethered inflatable chambers or regions 144, which are described in more detail below.

In some embodiments, the inflatable curtain airbag 120 can include one or more non-inflatable portions or regions 151, one or more of which may be positioned between adjacent inflatable chambers 142 or at an interior of an inflatable chamber 142 (e.g., so as to be encompassed by an inflatable chamber 142).

In various embodiments, at least a portion of one or more of the inflatable chambers 142 and the non-inflatable portions 151 can be defined by one or more boundary seams 155. The one or more boundary seams 155 may be formed in any suitable manner. For example, as discussed in more detail below, the boundary seams 155 may be woven portions that are formed via one-piece weaving (OPW) techniques. In other or further embodiments, the one or more boundary seams 155 may include one or more of stitches, welds (e.g., radiofrequency welds), and/or adhesives. In some embodiments, the boundary seams 155 may join together two or more pieces of fabric, such as a front face 132 and a rear face 134. In some embodiments, the one or more boundary seams 155 are substantially airtight so as to be able to retain inflation gas within a given inflatable chamber 142. The one or more boundary seams 155 can be said to fluidly isolate adjacent inflatable chambers 142 from each other. In other embodiments, the one or more boundary seams 155 may not be airtight, but may instead resist egress of gases from an inflatable chamber 142.

The shapes of the inflatable curtain airbag 120 and its various components, such as the inflatable chambers 142, that are depicted in FIG. 1B are not necessarily limiting. These shapes may be altered, such as to accommodate differently shaped vehicles. In some embodiments, the deployed or inflated inflatable curtain airbag 120 is configured to fit within the side window wells of vehicle 50. The inflatable curtain airbag 120 can include a contiguous piece of material manufactured using an OPW technique. For example, the front and rear faces 132, 134 may be formed from a unitary piece of material.

As can be appreciated from FIGS. 1A and 1B, when the inflatable curtain airbag 120 is in the packaged configuration, all components of the inflatable curtain airbag 120 can be at an interior of the restraint 102. In the illustrated embodiment, the restraint 102 is a sleeve that covers an entirety of the inflatable curtain airbag 120. However, in other embodiments, the restraint 102 may merely include a plurality of straps, and each strap may encompass a portion of various components of the inflatable curtain airbag 120, such as, for example, portions of the inflation gas delivery channel.

Figure 2:
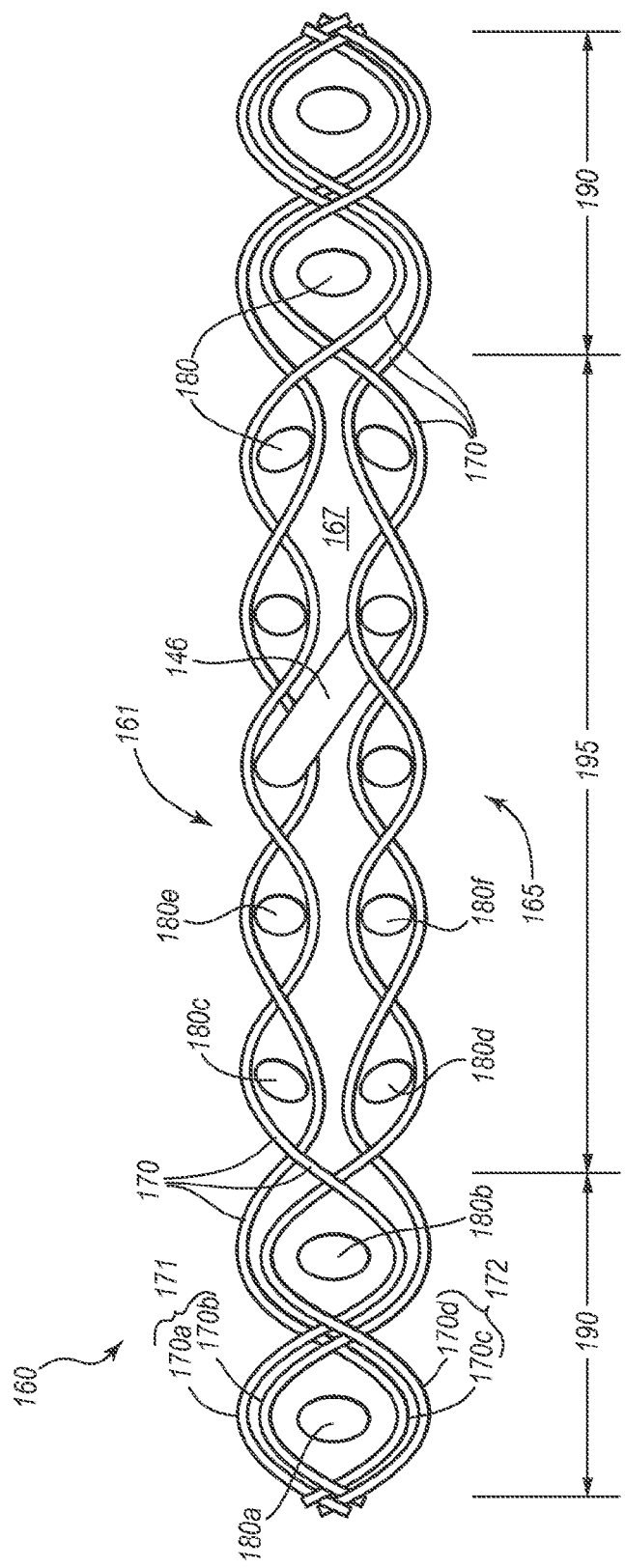
FIG. 2 is a side cross-section view of a woven airbag fabric according to one embodiment of the present disclosure.

FIG. 2 is a side cross-section view of a woven airbag fabric 160. A plurality of warp yarns 170 may be interwoven with a plurality of weft yarns 180. As illustrated, the plurality of warp yarns 170 may include four sets of warp yarns 170; including first and second pairs 171, 172 of warp yarn sets. Although single warp yarn threads 170 are shown, each warp yarn thread 170 may represent a plurality of warp yarns that include a warp yarn set. In the actual weaving process of the inflatable fabric, an entire warp yarn set may be positioned in like manner to its corresponding single warp yarn as depicted. Consequently, the four warp yarns 170 displayed in FIG. 2 represent four sets of warp yarns 170.

In some embodiments, the first pair 171 of warp yarn sets may include first and second sets 170a, 170b of warp yarns. The second pair 172 of warp yarn sets may include third and fourth sets 170c, 170d of warp yarns. Airbag fabric 160 can be woven by creating two fabric portions, a non-inflatable fabric portion 190 and an inflatable fabric portion 195. When the inflatable fabric portion 195 is woven, the first and second pairs 171, 172 of warp yarn sets may alternately correspond to, respectively, first and third sets 170a, 170c of warp yarns and second and fourth sets 170b, 170d of warp yarns, as will be described hereafter.

The non-inflatable fabric portion 190 and the inflatable fabric portion 195 are woven from the same plurality of warp yarns 170 and weft yarns 180, forming an integral airbag fabric 160 during the OPW process. The non-inflatable fabric portion 190 is thus woven with first and second warp yarn sets 170a, 170b woven over a first adjacent weft yarn 180a while third and fourth warp yarn sets 170c, 170d are woven under the first adjacent weft yarn 180a. Further, the first and second warp yarn sets 170a, 170b are woven under a second adjacent weft yarn 180b while third and fourth warp yarn sets 170c, 170d are woven over the second adjacent weft yarn 180b. This manner of weaving produces a weaving pattern, which may be repeated to form a desired length of a non-inflatable fabric portion 190. In some embodiments, the non-inflatable fabric portion 190 can include a two-dimensional seam and/or one or more "zero-length" tethers. For example, "zero-length" tethers may correspond to non-inflatable portions 151 and/or boundary seams 155 (see FIG. 1B).

Other ways of alternating weaving warp yarn sets 170a, 170b, 170c, 170d may also create a non-inflatable fabric portion 190, such as by weaving one set of warp yarns over a first adjacent weft yarn 180a while weaving the other three sets of warp yarns (or the remainder of the four sets of warp yarns) under the first adjacent weft yarn 180a. Weaving warp yarn sets around a second adjacent weft yarn 180b could follow the one/three split of warp yarn sets, or change back to weaving first and second pairs 171, 172 of warp yarn sets on either side of subsequent weft yarns 180. Furthermore, more than four warp yarn sets may be used. Consequently, there are multiple ways to weave the non-inflatable fabric portion 190, which may result in an integral, single piece of woven fabric.

The inflatable fabric portion 195 may be woven from the same plurality of warp yarns 170 and weft yarns 180 as used to weave the non-inflatable fabric portion 190. That is, first warp yarn set 170a can be woven over a first adjacent weft yarn 180c while third warp yarn set 170c is woven under the first adjacent weft yarn 180c. Further, first warp yarn set 170a may be woven under a second adjacent weft yarn 180e while third warp yarn set 170c is woven over the second adjacent weft yarn 180e. Additionally, second warp yarn set 170b is woven over a third adjacent weft yarn 180d while fourth warp yarn set 170d is woven under the third adjacent weft yarn 180d. Further, second warp yarn set 170b is woven under a fourth adjacent weft yarn 180f while fourth warp yarn set 170d is woven over the fourth adjacent weft yarn 180f. This manner of weaving produces a weaving pattern, which may be repeated to form a desired length of an inflatable fabric portion 195.

In the embodiment depicted, the first and third warp yarn sets 170a, 170c are alternately woven around adjacent weft yarns 180c, 180e to form a first woven fabric layer 161. Likewise, the second and fourth warp yarns sets 170b, 170d are alternately woven around additional adjacent weft yarns 180d, 180f to form an opposing, second woven fabric layer 165. The weaving of first and second opposing, woven fabric layers 161, 165 may occur in parallel and concurrently for efficiency (i.e., during an OPW process). To make an inflatable fabric portion 195 of desired length, the weaving of first and second opposing, woven fabric layers 161, 165 is repeated until the desired length is obtained. After the inflatable fabric portion 195 is woven in the OPW process, weaving can transition to again form only a non-inflatable fabric portion 190, as described above, thereby forming at least one inflatable space or cell 167 between the first and second opposing, woven fabric layers 161, 165 and the non-inflatable fabric portion(s) 190.

The inflatable fabric portion 195 may also include one or more internal tethers 146, each with a "greater-than-zero" length, which can extend between each of the first woven fabric layer 161 and the second woven fabric layer 165 and through at least a portion of the inflatable space 167. Formation of the one or more internal tethers 146 is described in more detail below.

In some embodiments, the airbag fabric 160 may not require sewing of seams to seal the inflatable space 167. As the OPW process progresses, a plurality of varying shapes and sizes of inflatable spaces 167 may be formed in the fabric 160 having first and second pairs 171, 172 of warp yarn sets. These inflatable spaces 167 may be created by the non-inflatable fabric portion 190 partitioning different areas of the inflatable fabric portion 195 through the use of a weaving pattern.

Figure 3:
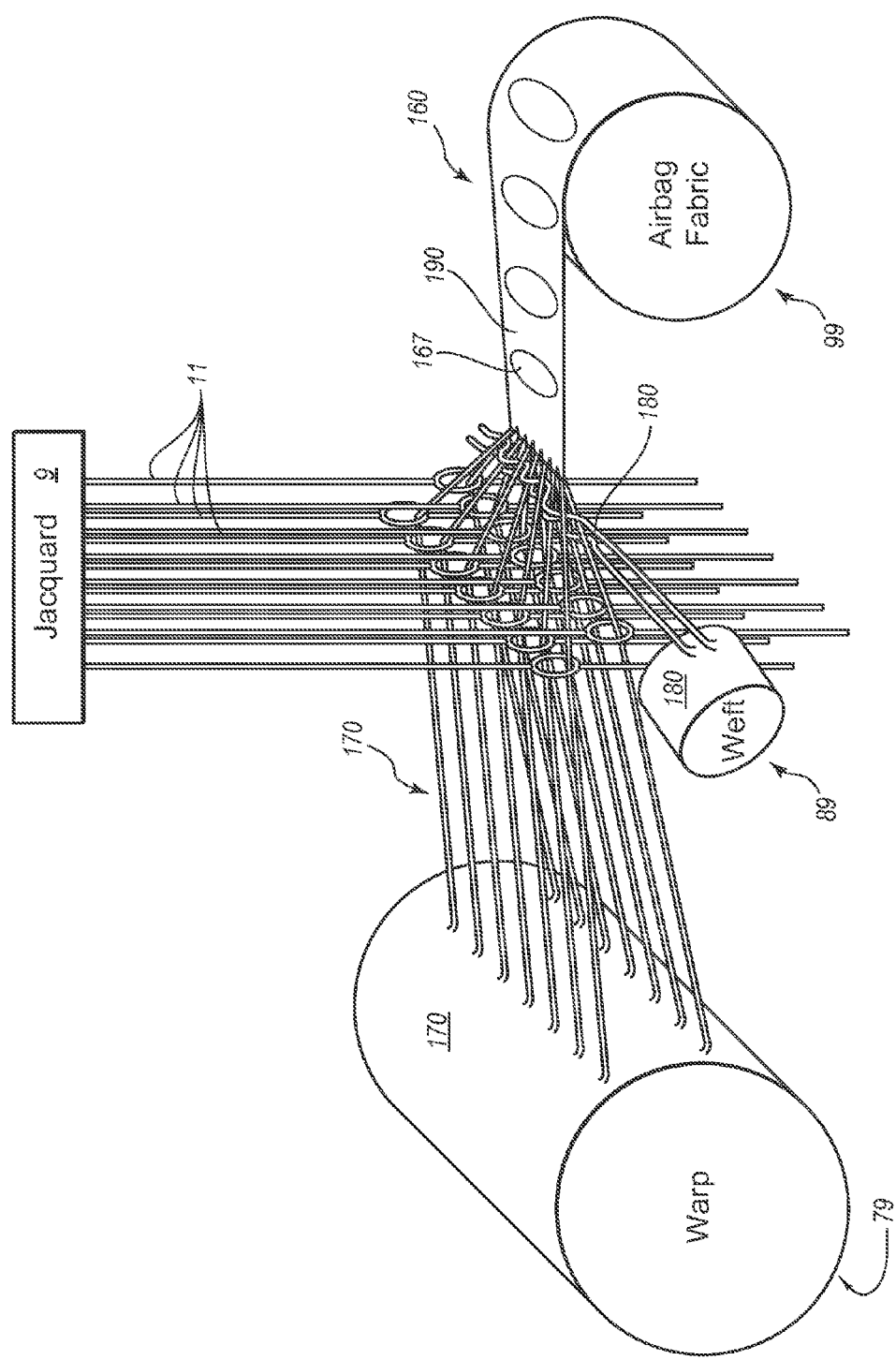
FIG. 3 is a perspective view of a Jacquard loom and one embodiment of weaving an airbag fabric.

FIG. 3 is a perspective view of one embodiment of weaving airbag fabric 160 with a loom, such as a Jacquard loom 9, having a plurality of lifting bars 11. Warp yarn sets 170 are spun from at least one warp yarn spool 79, although multiple warp yarn spools 79 may be used, for example, one warp yarn spool 79 each for warp yarn set pairs 171, 172 (see FIG. 2). Warp yarns 170 can be fed into lifting bars 11 of Jacquard loom 9. As each set of warp yarns 170 is lifted as directed by a computer, punch card, or other suitable mechanism (not shown), a weft yarn spool 89 inserts or picks at least one weft yarn 180 through the warp yarn sets 170. Weights (not shown) may be used to batten, or press home, the weft yarns 180 into woven fabric 160, which can exit onto a fabric spool 99. The alternation of the warp yarns 170 and weft yarns 180 to produce airbag fabric 160 was explained briefly in reference to FIG. 2. Note that airbag fabric 160, as shown, can include alternating patterns of non-inflatable fabric portions 190 and inflatable cells 167, which may be used to produce an airbag.

Figure 4A:
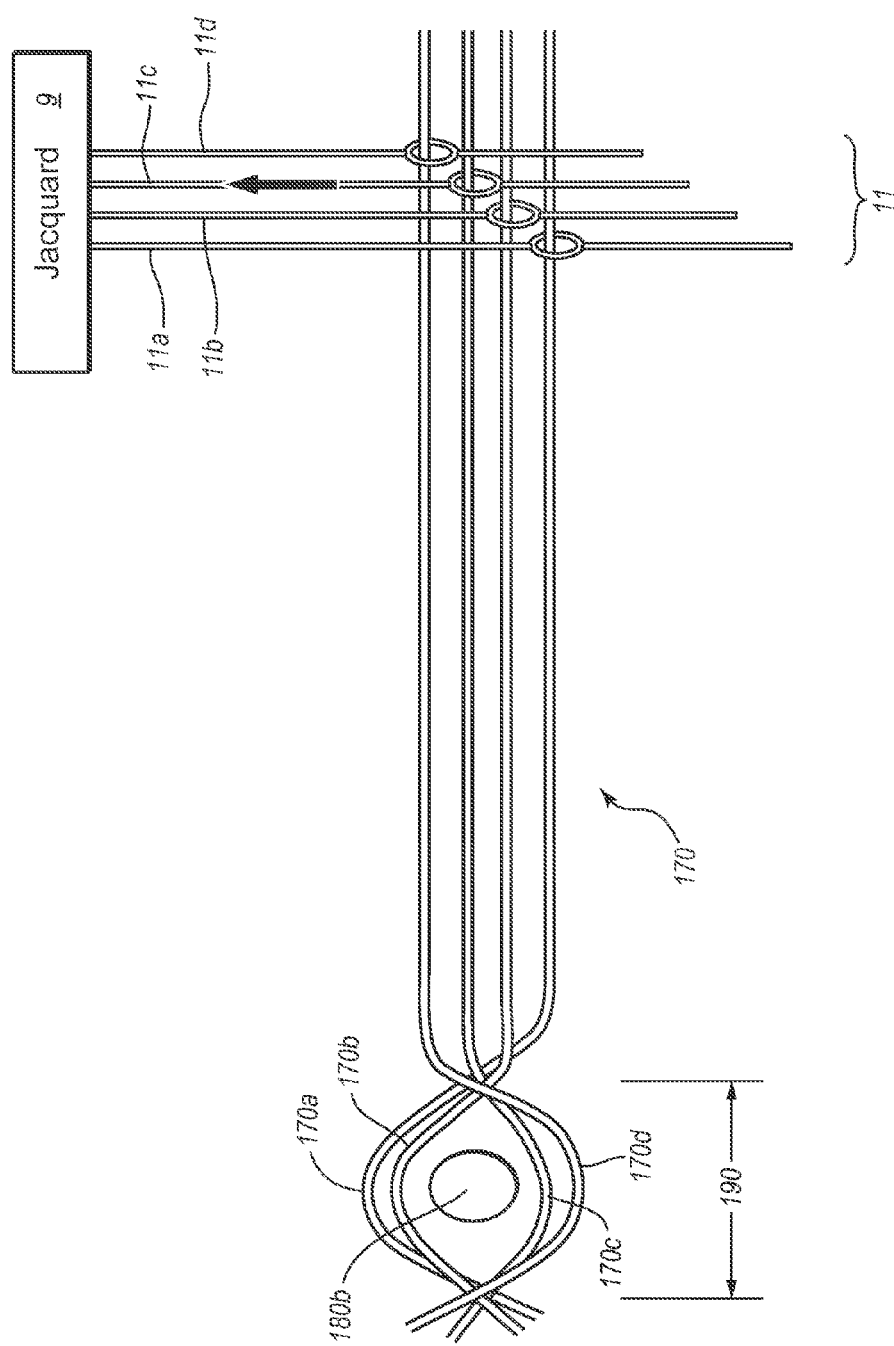
FIG. 4A is a side cross-section view of the Jacquard loom of FIG. 3 depicting four sets of alternating warp yarns interwoven with a first weft yarn formed in a non-inflatable fabric portion.

FIGS. 4A-4F depict a more detailed set of steps that may be used in some embodiments of weaving airbag fabric 160, each showing a cross-section view of a portion of Jacquard loom 9, depicting four sets 170a, 170b, 170c, 170d of alternating warp yarns 170 woven around weft yarns 180. FIG. 4A illustrates the four warp yarn sets 170a, 170b, 170c, 170d interwoven with weft yarn 180b formed in a non-inflatable fabric portion 190. This may provide a starting point before an inflatable fabric portion 195 is woven. As depicted, first and second warp yarn sets 170a, 170b may be woven over an adjacent weft yarn 180b, and third and fourth warp yarn sets 170c, 170d may be woven under the adjacent weft yarn 180b. First, second, third, and fourth warp yarn sets 170a, 170b, 170c, 170d may be coupled to corresponding first, second, third, and fourth sets 11a, 11b, 11c, 11d of lifting bars 11 of Jacquard loom 9.

Figure 4B:
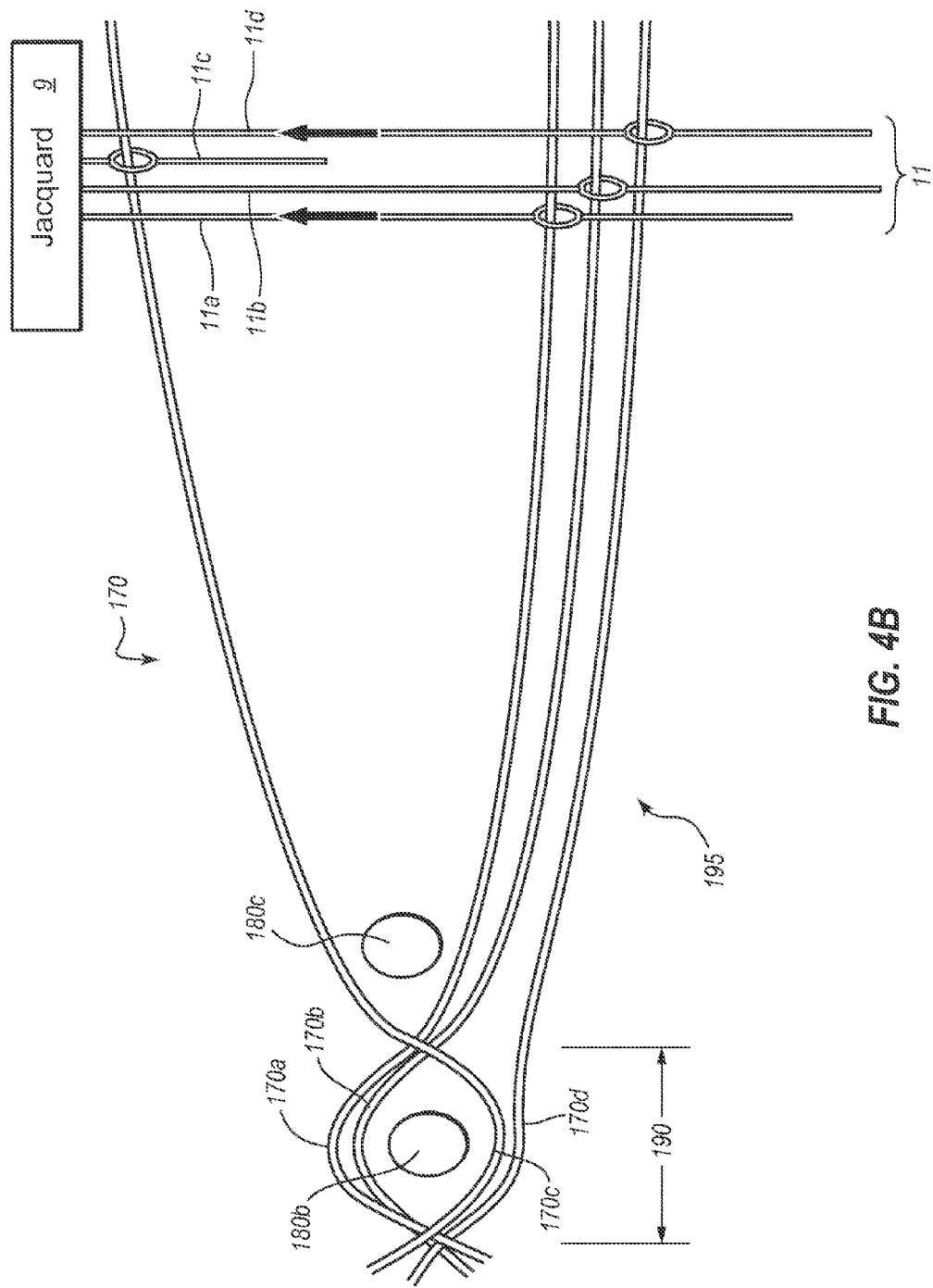
FIGS. 4B-4F are side cross-section views as in FIG. 4A, illustrating a series of steps of a process, according to one embodiment, to form two opposing layers including an inflatable portion of an airbag fabric.

FIG. 4B illustrates a first step of weaving an inflatable fabric portion 195 according to some embodiments. After the third set 11c of lifting bars is raised, a first adjacent weft yarn 180c can be inserted through the gap created between first and third warp yarn sets 170a, 170c. The arrows superimposed adjacent first and fourth sets 11a, 11d of lifting bars indicate that these are to be raised in the next step.

Figure 4C:
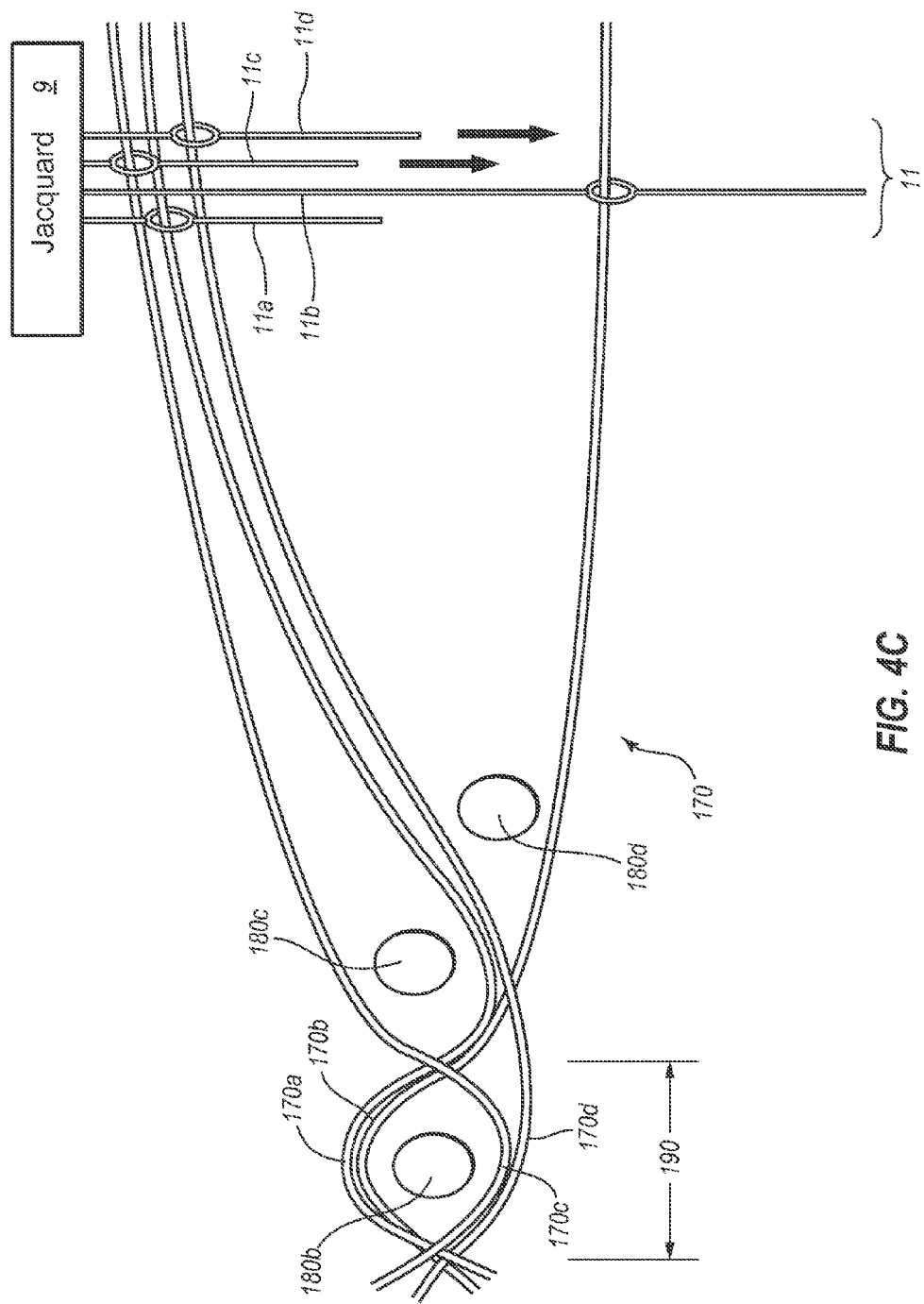

FIG. 4C illustrates the result of raising first and fourth sets 11a, 11d of lifting bars, creating another gap, this time between second and fourth warp yarn sets 170b, 170d, through which is inserted a second adjacent weft yarn 180d. The arrows superimposed adjacent third and fourth sets 11c, 11d of lifting bars indicate that these are to be dropped in the next step.

Figure 4D:
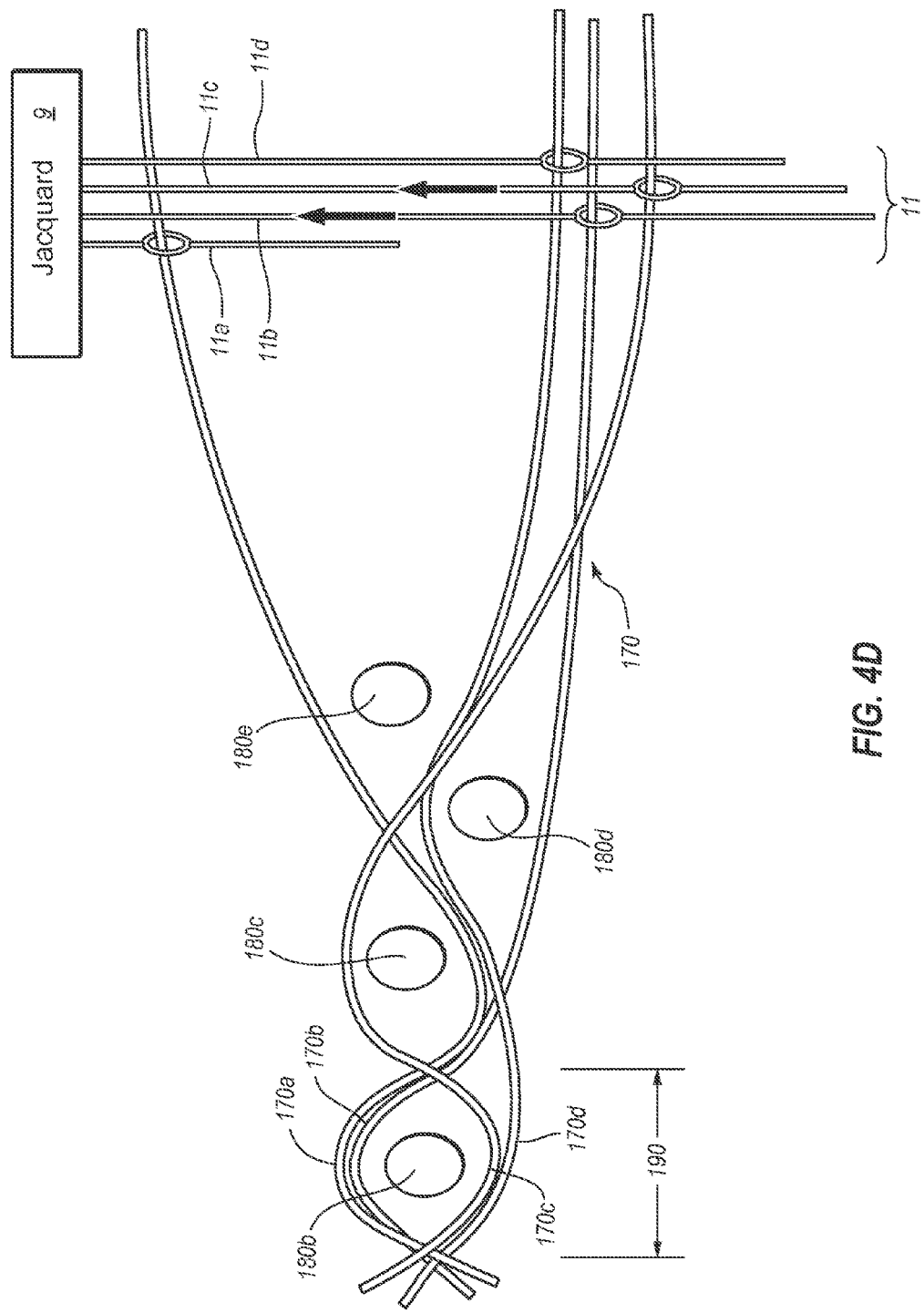

FIG. 4D illustrates the result of dropping third and fourth sets 11c, 11d of lifting bars, creating another gap between first and third warp yarns sets 170a, 170c, through which is inserted a third adjacent weft yarn 180e. The arrows superimposed adjacent second and third sets 11b, 11c of lifting bars indicate that these are to be raised in the next step.

Figure 4E:
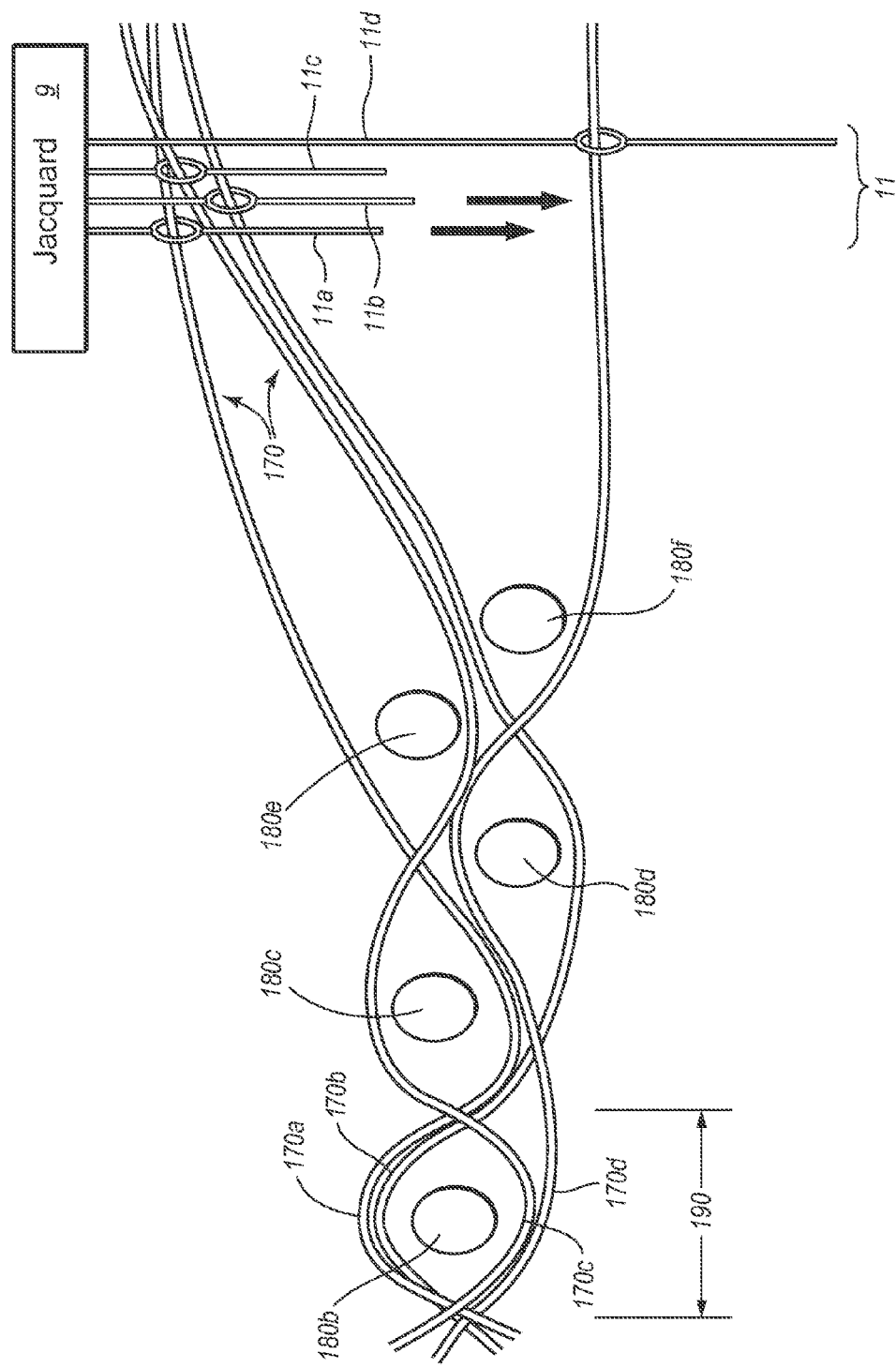

FIG. 4E illustrates the result of raising second and third sets 11b, 11c of lifting bars, creating another gap between second and fourth warp yarn sets 170b, 170d, through which is inserted a fourth adjacent weft yarn 180f. The arrows superimposed adjacent first and second sets 11a, 11b of lifting bars indicate that these are to be dropped in the next step.

Figure 4F:
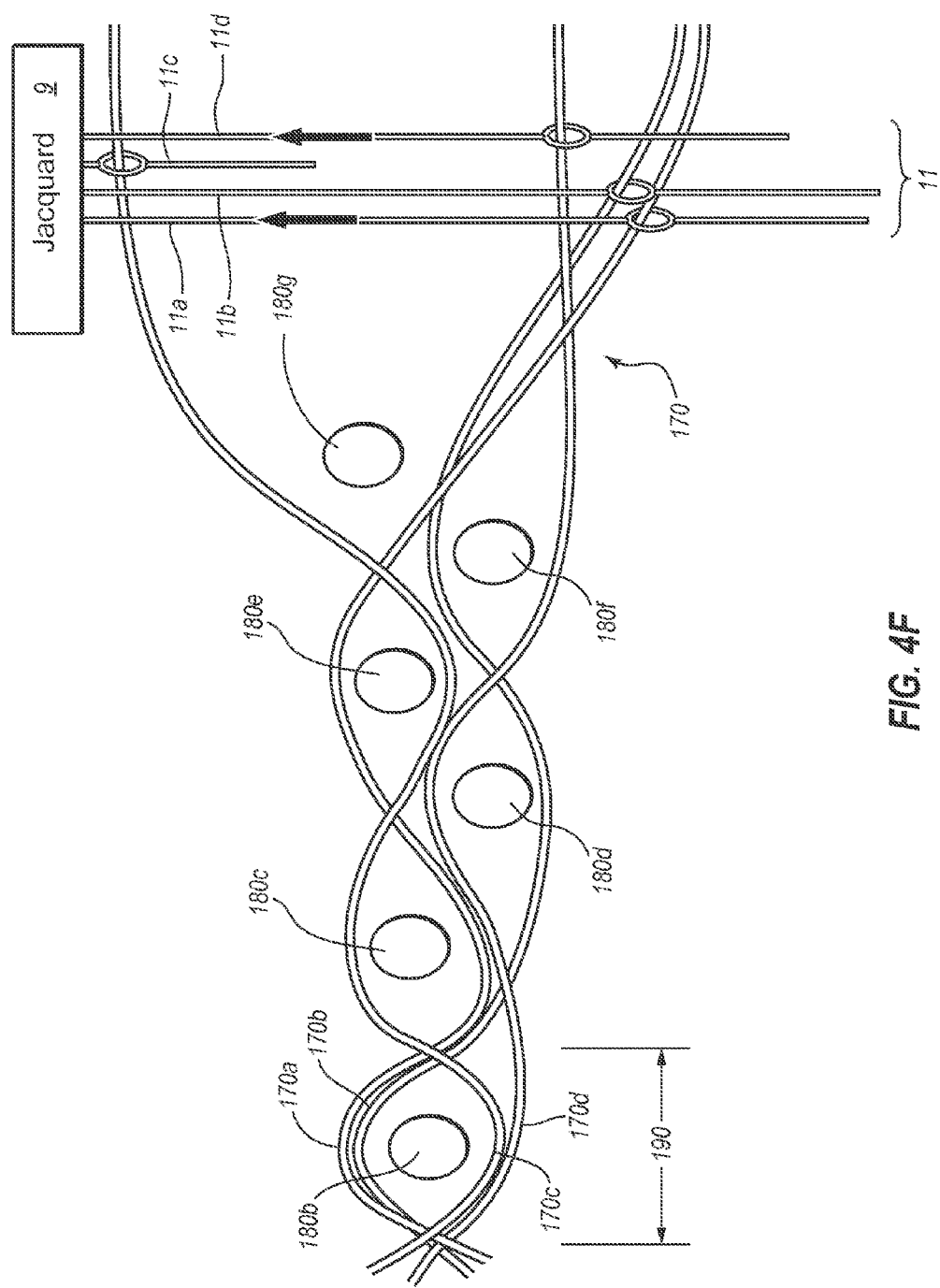

FIG. 4F illustrates the result of dropping first and second sets 11a, 11b of lifting bars, creating another gap between first and third warp yarn sets 170a, 170c, through which is inserted a fifth adjacent weft yarn 180g. The arrows superimposed adjacent first and fourth sets 11a, 11d of lifting pairs indicate these are next to be raised.

Figure 4G:
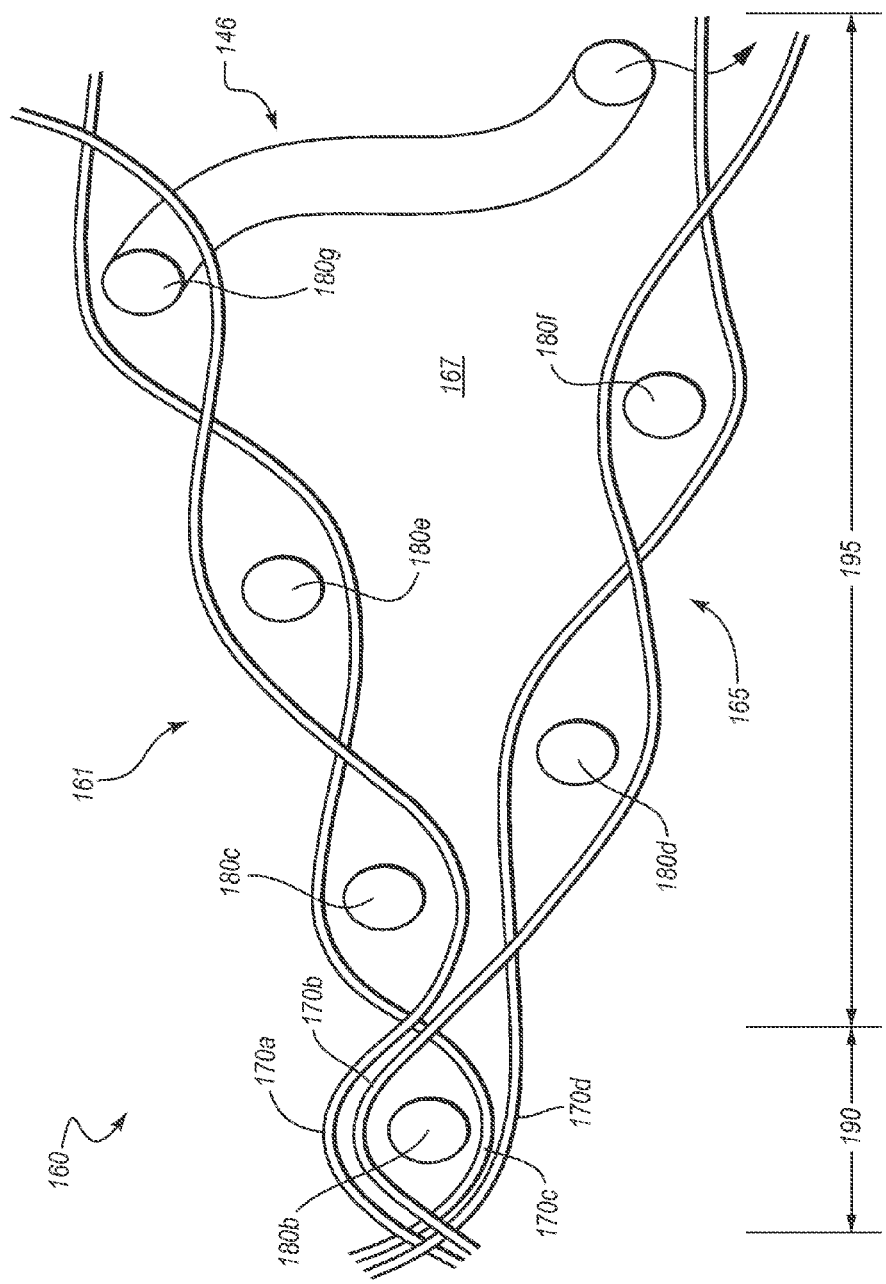
FIG. 4G is a side cross-section view as in FIGS. 4A-4F, illustrating an embodiment of a step to form an internal tether in the inflatable portion of the airbag fabric.

If the weaving process were to end at this point, FIG. 4G shows the result of six weft yarns 180b, 180c, 180d, 180e, 180f, 180g having been alternately woven into four warp yarn sets 170a, 170b, 170c, 170d in a parallel weaving process. As displayed, first woven fabric layer 161 includes first and third warp yarn sets 170a, 170c. Also, second woven fabric layer 165 includes second and fourth warp yarn sets 170b, 170d. The exact assigned numbers of the respective warp yarn sets of first and second woven fabric layers 161, 165 are only exemplary for ease of explanation, and are not meant to provide limitations to the scope of this disclosure. Nevertheless, it should be apparent that first and second woven fabric layers 161, 165 are separated and opposing in relation, thereby forming an inflatable space 167 therebetween. The weaving process may continue to form an inflatable fabric portion 195 of a desired length, and through the pattern controlled by the computer, punch card, or other suitable mechanism, the Jacquard loom 9 may weave at least one contiguous non-inflatable fabric portion 190.

It should be noted that use of the OPW process enables the weaving of both an inflatable fabric portion 195 and a non-inflatable fabric portion 190 from the same sets of warp yarns 170a, 170b, 170c, 170d during a continuous weaving process. Note that each of the first and second woven fabric layers 161, 165 may be of varying lengths, if desired, to produce varying dimensions to parts of an inflatable airbag. This may still be accomplished through the same continuous weaving process by simply continuing to weave one of the first and second woven fabric layers 161, 165 while stopping for a time the weaving of the other of the first and second woven fabric layers 161, 165.

FIG. 4G further illustrates an embodiment of a step to form an internal tether 146 in the inflatable fabric portion 195 of the airbag fabric 160. As illustrated, an internal tether 146 can be formed between each of the first woven fabric layer 161 and the second woven fabric layer 165 through the use of a weaving pattern. For simplicity of discussion, the one or more internal tethers 146 may be discussed herein as being formed from at least one weft yarn, although equally within the scope of this disclosure are internal tethers formed from at least one warp yarn. Therefore, specific reference to warp or weft yarns in the present disclosure should not limit the scope of the one or more internal tethers where warp yarns are interchangeable with weft yarns. The weaving pattern may include releasing at least a portion of at least one weft yarn 180g of the first woven fabric layer 161 and weaving at least a portion of the at least one weft yarn 180g of the first woven fabric layer 161 into the second woven fabric layer 165 to form the internal tether 146. Likewise, the weaving pattern may include releasing at least a portion of at least one weft yarn of the second woven fabric layer 165 and weaving at least a portion of the at least one weft yarn of the second woven fabric layer 165 into the first woven fabric layer 161 to form an internal tether.

In some embodiments, one or more internal tethers may be disposed in an inflatable chamber of an inflatable curtain airbag to form a tethered inflatable chamber. The one or more internal tethers may be configured to break when an internal pressure of the tethered inflatable chamber reaches a predetermined value or exceeds a threshold. Accordingly, one or more tethered inflatable chambers disposed in an inflatable curtain airbag may reduce, or effectively reduce, a volume of the inflatable curtain airbag. An inflatable curtain airbag including one or more tethered inflatable chambers may deploy more evenly across the inflatable curtain airbag than an inflatable curtain airbag lacking one or more tethered inflatable chambers. Additionally, an inflatable curtain airbag including one or more tethered inflatable chambers may deploy into a predetermined position more quickly than an inflatable curtain airbag lacking one or more tethered inflatable chambers.

In certain embodiments, the one or more internal tethers may act to at least partially regulate an internal pressure (e.g., a working pressure) of an inflatable curtain airbag. In some circumstances, the inflator may overpressurize the inflatable curtain airbag (i.e., due to elevated deployment temperature, inflator variability, etc.). The one or more internal tethers may be configured to break when an inflatable curtain airbag is overpressurized.

In various embodiments, an inflatable curtain airbag may be configured to deploy through at least a portion of a narrow gap or space within a vehicle prior to inflating to a predetermined or designed width of the inflatable curtain airbag. For example, at least partially constraining the width of the inflatable curtain airbag during deployment can allow or permit the airbag to deploy through a narrow gap or space. In some embodiments, narrow gaps or spaces within a vehicle may be due to vehicle architecture, trim, seats, other airbags, vehicle occupants, cargo, and so on. One or more internal tethers that are configured to break may act to constrain the width of one or more portions of the inflatable curtain airbag (e.g., one or more tethered inflatable chambers) during deployment such that the inflatable curtain airbag may deploy through the narrow gap or space. In some embodiments, upon deployment of the inflatable curtain airbag through the one or more narrow gaps the inflatable curtain airbag and/or the inflator could be configured to increase an internal pressure of the inflatable curtain airbag such that at least a portion of the one or more internal tethers break and allow or permit the inflatable curtain airbag to deploy to a greater width (e.g., the designed or predetermined width).

Figure 5:
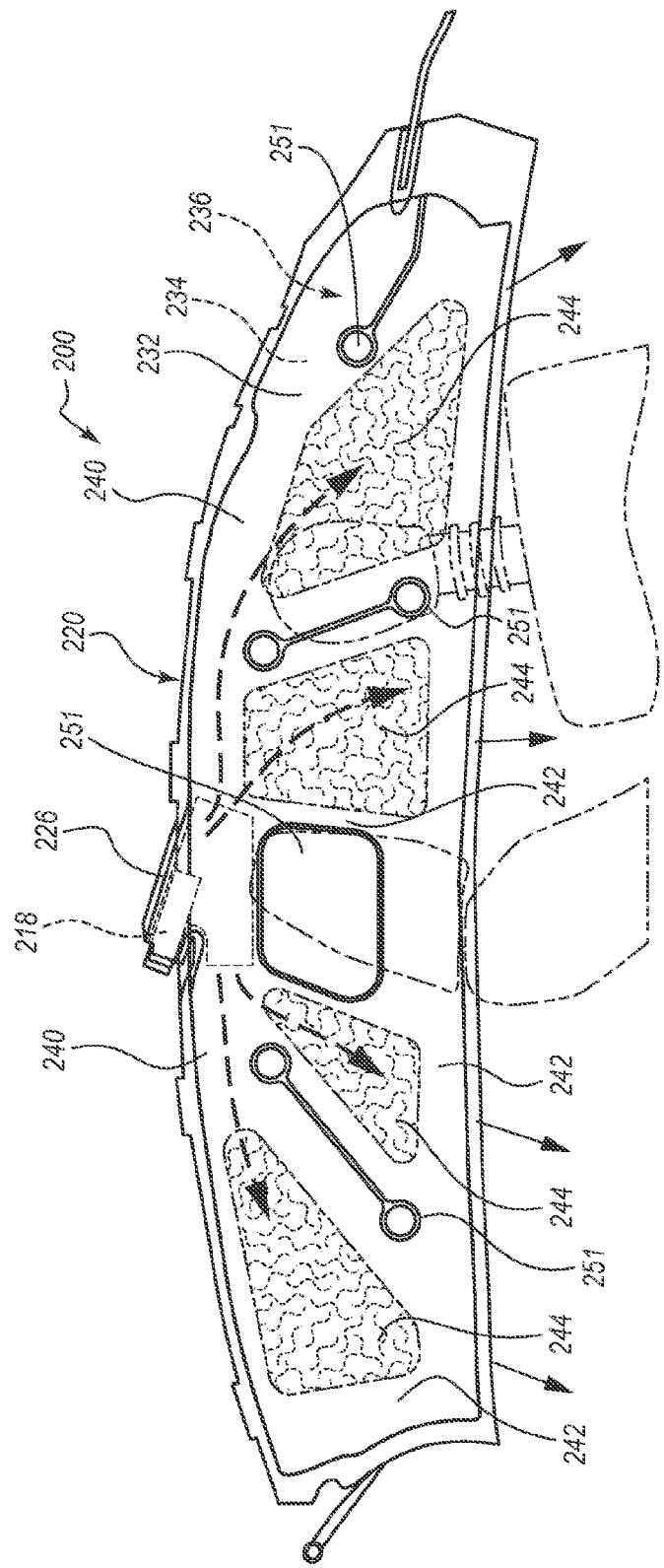
FIG. 5 is a side view of an inflatable curtain airbag assembly, according to another embodiment of the present disclosure, in a deployed state.

FIG. 5 is a side view of an inflatable curtain airbag assembly 200 that can resemble the inflatable curtain airbag assembly 100 described above in certain respects. Accordingly, like features are designated with like reference numerals, with the leading digits incremented to "2." Relevant disclosure set forth above regarding similarly identified features thus may not be repeated hereafter. Moreover, specific features of the inflatable curtain airbag assembly 200 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the inflatable curtain airbag assembly 200. Any suitable combination of the features and variations of the same described with respect to the inflatable curtain airbag assembly 100 can be employed with the inflatable curtain airbag assembly 200, and vice versa. This pattern of disclosure applies equally to further embodiments depicted in subsequent figures and described hereafter, wherein the leading digits may be further incremented.

FIG. 5 is a side view of an inflatable curtain airbag assembly 200, according to another embodiment of the present disclosure, in a deployed state. As illustrated, the assembly 200 can include an inflator 218 and an inflatable curtain airbag 220 coupled to the inflator 218 at a throat portion 226. For example, the throat portion 226 may be in fluid communication with the inflator 218. The inflatable curtain airbag 220, as depicted, has a longitudinal orientation. Stated another way, the inflatable curtain airbag 220 may extend from a forward portion of a vehicle to a rearward portion of the vehicle.

The inflatable curtain airbag 220 can include a front face 232 and a rear face 234. In some embodiments, the front face 232 and the rear face 234 may define a void 236 for receiving an inflation gas (i.e., from the inflator 218). In some configurations, the void 236 may correspond to the inflatable space or cell 167 as described above. In certain embodiments, the front face 232 and the rear face 234 may be formed from an airbag fabric. Similar to the void 236, in some configurations, the front and rear faces 232, 234 may correspond to the first and second woven fabric layers 161, 165 as described above. As depicted, the inflatable curtain airbag 220 can also include a plurality of inflatable chambers or inflatable cushion segments 242, wherein the inflatable chambers 242 can be in fluid communication with the throat portion 226 (i.e., via a gas delivery channel 240 or another suitable gas delivery configuration). In various embodiments, at least one of the inflatable chambers 242 may be, or may include, a tethered inflatable chamber 244. In the illustrated embodiment of FIG. 5, the inflatable curtain airbag 220 includes four tethered inflatable chambers 244. In certain embodiments, the inflatable curtain airbag may include one, two, three, four, five, six, seven, or more tethered inflatable chambers 244.

The tethered inflatable chambers 244 can include a plurality of internal tethers (see, e.g., FIG. 4G), as described above, disposed within the void 236. Each of the internal tethers can include at least one weft yarn, wherein the at least one weft yarn extends between the airbag fabric of the front face 232 and the airbag fabric of the rear face 234. Furthermore, each of the internal tethers can be configured to break or "pop" when an internal pressure of the tethered inflatable chamber 244 reaches a predetermined value. In some embodiments, the internal tethers may be configured such that the predetermined value is reached when a vehicle occupant strikes at least a portion of the inflatable curtain airbag 220 (i.e., during a collision event).

The internal tethers may be configured to break due to one or more factors (e.g., the size of the internal tethers, the material forming the internal tethers, the spacing of the threads forming the internal tethers, etc.). For example, in some embodiments, the internal tethers may have a thickness or other suitable structure such that the internal tethers are configured to break under certain conditions. A first portion of an internal tether may be thinner than one or more second portions of the internal tether, such that the first (thinner) portion of the internal tether is configured to break when an internal pressure of a tethered inflatable chamber reaches a predetermined value. In certain embodiments, the internal tethers may be formed from a material that is configured to fail when an internal pressure of a tethered inflatable chamber reaches a predetermined value. Upon failure of the material or a portion of the material, the internal tether may break. In various embodiments, the internal tethers may be formed from a plurality of threads. The configuration or spacing of the threads in one or more portions of the internal tethers may be designed such that the one or more portions of the internal tethers break when an internal pressure of a tethered inflatable chamber reaches a predetermined value.

With continued reference to FIG. 5, the inflatable curtain airbag 220 can also include one or more non-inflatable portions or regions 251. The one or more non-inflatable portions 251 may be formed as a single, woven airbag fabric layer. In some embodiments, a non-inflatable portion 251 may be disposed between two or more inflatable chambers 242. In various embodiments, a non-inflatable portion 251 may be disposed between an inflatable chamber 242 and a tethered inflatable chamber 244. In certain embodiments, a non-inflatable portion 251 may be disposed between two or more tethered inflatable chambers 244. Other configurations of the one or more non-inflatable portions 251 are also within the scope of this disclosure.

Internal tethers (i.e., tethers with a greater-than-zero length) can reduce, or effectively reduce, a volume of an inflatable curtain airbag. For example, internal tethers disposed within one or more inflatable chambers may reduce, or effectively reduce, a volume of the one or more tethered inflatable chambers. An inflatable curtain airbag including one or more tethered inflatable chambers may deploy more evenly across the inflatable curtain airbag than an inflatable curtain airbag lacking one or more tethered inflatable chambers. Additionally, an inflatable curtain airbag including one or more tethered inflatable chambers may deploy into a predetermined position more quickly than an inflatable curtain airbag lacking one or more tethered inflatable chambers. Stated another way, an inflatable curtain airbag including a tethered inflatable chamber may exhibit a quicker "in position" time. For example, a first inflatable curtain airbag having a smaller volume than a second inflatable curtain airbag may inflate more quickly than the second inflatable curtain airbag. Furthermore, the first inflatable curtain airbag may more quickly spread out and occupy its intended position or space than the second inflatable curtain airbag.

In some embodiments, the internal tethers may be configured or tuned such that, upon deployment of an inflatable curtain airbag in which the internal tethers are disposed, the internal tethers can break and allow or permit the inflatable curtain airbag to deploy to a full deployment width. For example, a portion of an inflatable curtain airbag that includes unbroken or intact internal tethers may deploy to a partial deployment width. In certain embodiments, the internal tethers may be configured or tuned such that upon positioning or deployment of an inflatable curtain airbag, the internal tethers can break and thus allow or permit the positioned inflatable curtain airbag to further deploy to a full deployment width.

In various embodiments, an airbag (e.g., an inflatable curtain airbag) may include a front panel of fabric and a rear panel of fabric. The rear panel of fabric may be coupled to the front panel of fabric to define one or more inflatable chambers. In some embodiments, the one or more inflatable chambers can be in fluid communication with an inflator. In certain embodiments, the one or more inflatable chambers can receive inflation gas from the inflator. The airbag may also include one or more internal tethers disposed in a tethered inflatable chamber of the one or more inflatable chambers. The one or more internal tethers may each include at least one weft yarn that extends between the fabric of the front panel and the fabric of the rear panel. Furthermore, the one or more internal tethers can be configured to transition from an unbroken configuration to a broken configuration when an internal pressure in the tethered inflatable chamber exceeds a threshold.

Figure 6:
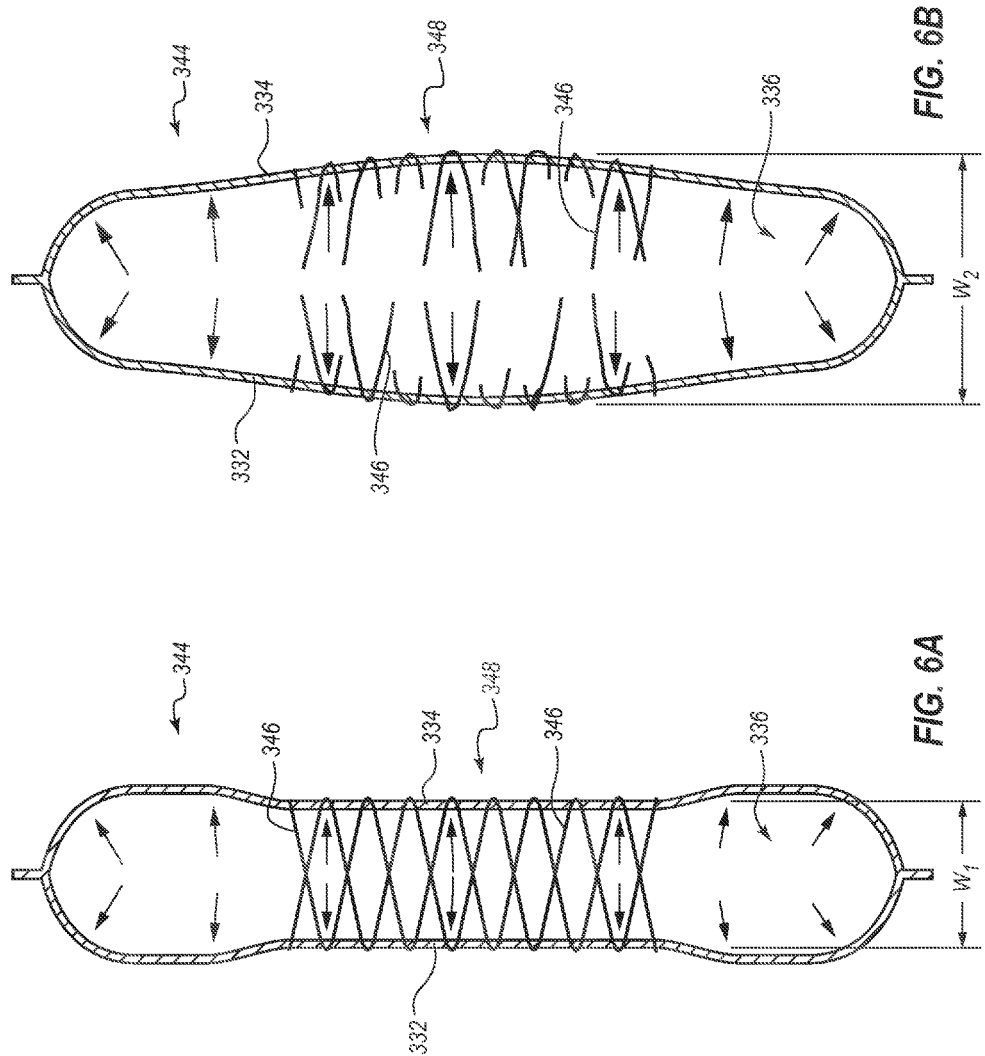
FIG. 6A is a cross-section view of a tethered inflatable chamber, according to one embodiment of the present disclosure, wherein the internal tethers are in an unbroken configuration.
FIG. 6B is a cross-section view of the tethered inflatable chamber of FIG. 6A, wherein the internal tethers are in a broken configuration.

FIG. 6A is a cross-section view of a tethered inflatable chamber 344, according to one embodiment of the present disclosure, in a first inflation state. In some embodiments, the first inflation state may be a non-inflated state or a partially inflated state. FIG. 6B is a cross-section view of the tethered inflatable chamber 344 of FIG. 6B in a second inflation state. In some embodiments, the second inflation state may be a partially inflated state or a fully inflated state. As illustrated in FIGS. 6A and 6B, the second inflation state is more fully inflated than the first inflation state.

The tethered inflatable chamber 344 can include one or more internal tethers 346 or a plurality of internal tethers 346. As discussed above, the one or more internal tethers 346 can include one or more weft yarns. The one or more weft yarns may extend between each of the airbag fabric of the front face 332 and the airbag fabric of the rear face 334 of the tethered inflatable chamber 344. In various embodiments, each of the one or more internal tethers 346 may include a set of weft yarns.

Additionally, the internal tethers 346 may be configured to break when an internal pressure of the tethered inflatable chamber 344 reaches a predetermined value. The arrows in each of FIGS. 6A and 6B can represent internal pressure within the tethered inflatable chamber 344 as exerted, for example, by an inflation gas disposed within a void 336 of the tethered inflatable chamber 344. As illustrated, the arrows in FIG. 6B are larger than the arrows in FIG. 6A to indicate that the internal pressure in the tethered inflatable chamber 344 of FIG. 6B may be greater than the internal pressure in the tethered inflatable chamber 344 of FIG. 6A.

The plurality of internal tethers 346 of the tethered inflatable chamber 344 of FIG. 6A are in an unbroken configuration (i.e., prior to the internal pressure of the tethered inflatable chamber 344 reaching the predetermined value). In some embodiments, the at least one weft yarn of the one or more internal tethers 346 may be integral with the airbag fabric of each of the front face 332 and the airbag fabric of the rear face 334 of the tethered inflatable chamber 344.

With reference to FIG. 6A, the tethered inflatable chamber 344 can have a first volume when a portion, a majority, substantially all, or all of the internal tethers 346 are in the unbroken configuration. In some embodiments, substantially all of the internal tethers may refer to at least 80% of the internal tethers, at least 85% of the internal tethers, at least 90% of the internal tethers, at least 95% of the internal tethers, and so on. With reference to FIG. 6B, the tethered inflatable chamber 344 can have a second volume when a portion, a majority, substantially all, or all of the internal tethers 346 are in the broken configuration. As depicted, the second volume may be greater than the first volume. Similarly, at least a middle portion 348 of the tethered inflatable chamber 344 can have a first width or first internal distance $W_1$ (see FIG. 6A) when a portion, a majority, substantially all, or all of the internal tethers 346 are in the unbroken configuration. Likewise, the middle portion 348 of the tethered inflatable chamber 344 can have a second width or second internal distance $W_2$ (see FIG. 6B) when a portion, a majority, substantially all, or all of the internal tethers 346 are in the broken configuration. As depicted, the second width $W_2$ may be greater than the first width $W_1$.

In certain embodiments, an internal distance between the front face 332 and the rear face 334 of the tethered inflatable chamber 344 may be configured to increase when a portion, a majority, substantially all, or all of the internal tethers 346 transition from the unbroken configuration to the broken configuration. For example, in some embodiments, the internal distance may be configured to at least double upon breaking of a portion, a majority, substantially all, or all of the internal tethers 346. In some other embodiments, the internal distance may be configured to at least triple upon breaking of a portion, a majority, substantially all, or all of the internal tethers 346. The internal distance may be configured to increase less than double, to at least double, to at least triple, to at least quadruple, to at least quintuple, etc., upon breaking of a portion, a majority, substantially all, or all of the internal tethers.

Figure 7:
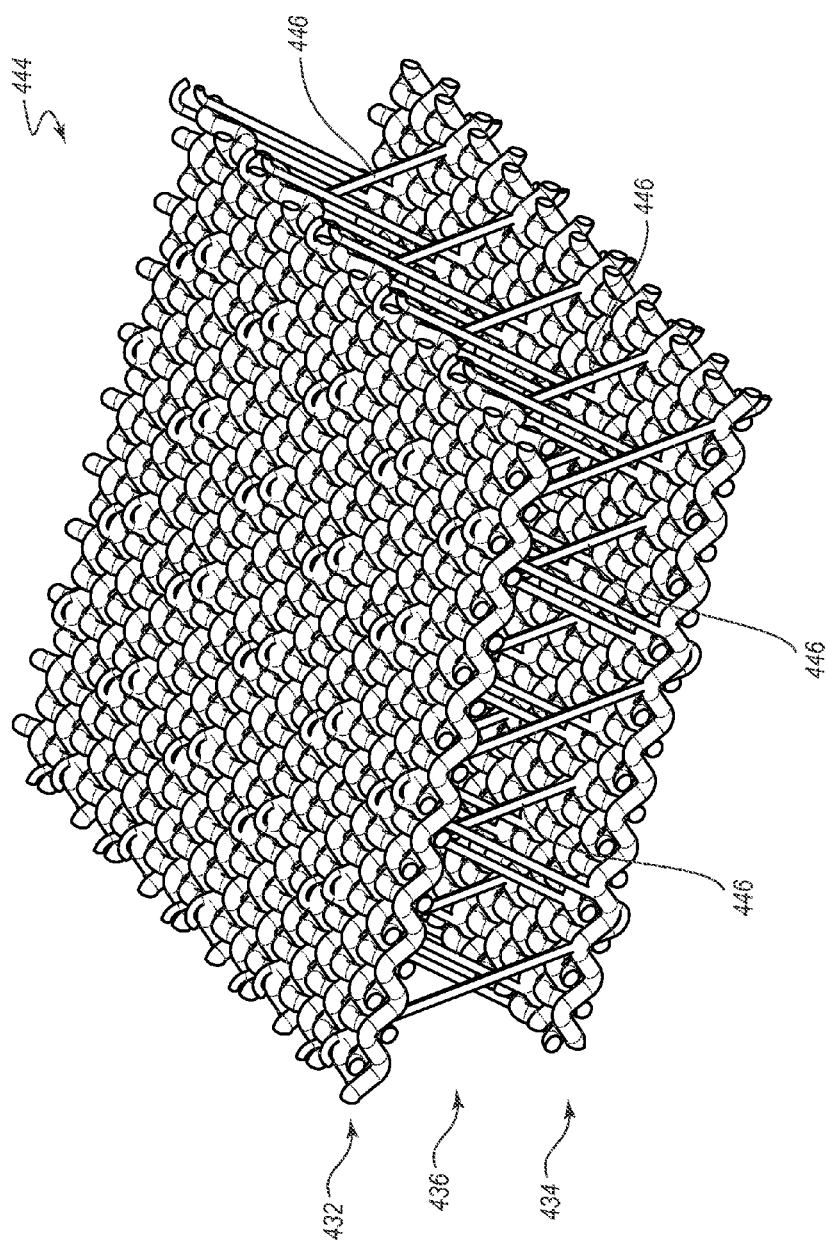
FIG. 7 is a detail view of a portion of a tethered inflatable chamber according to one embodiment of the present disclosure.

FIG. 7 is a detail view of a portion of a tethered inflatable chamber 444 according to one embodiment of the present disclosure. As depicted, the tethered inflatable chamber 444 can include a front face 432 and a rear face 434, which define a void 436 disposed between each of the front face 432 and the rear face 434. Furthermore, a plurality of internal tethers 446 may extend between each of the front face 432 and the rear face 434. The internal tethers 446 may be integral (e.g., integrally formed such as by OPW technology) with each of the front face 432 and the rear face 434 of the tethered inflatable chamber 444. In the embodiment of FIG. 7, the plurality of internal tethers 446 are depicted in an unbroken state. As discussed above, a portion, a majority, or each of the internal tethers 446 may be configured to transition from the unbroken configuration to a broken configuration when an internal pressure (e.g., due to an accumulation of inflation gas within the void 436 or due to at least a portion of the inflatable curtain airbag being struck by a vehicle occupant) of the tethered inflatable chamber 444 reaches a predetermined value. In some embodiments, a first portion of the internal tethers 446 may be configured to break when the internal pressure reaches a first predetermined value, and a second portion of the internal tethers 446 may be configured to break when the internal pressure reaches a second predetermined value. In further embodiments, a first portion of the internal tethers 446 may be configured to break when the internal pressure reaches a first predetermined value, a second portion of the internal tethers 446 may be configured to break when the internal pressure reaches a second predetermined value, a third portion of the internal tethers 446 may be configured to break when the internal pressure reaches a third predetermined value, and so on. Inflatable curtain airbags including one or more of the above-described configurations of tethered inflatable chamber 444 may be more suitable than inflatable curtain airbags lacking tethered inflatable chambers under various conditions (e.g., during a collision event; an out-of-position occupant).

Figure 8:
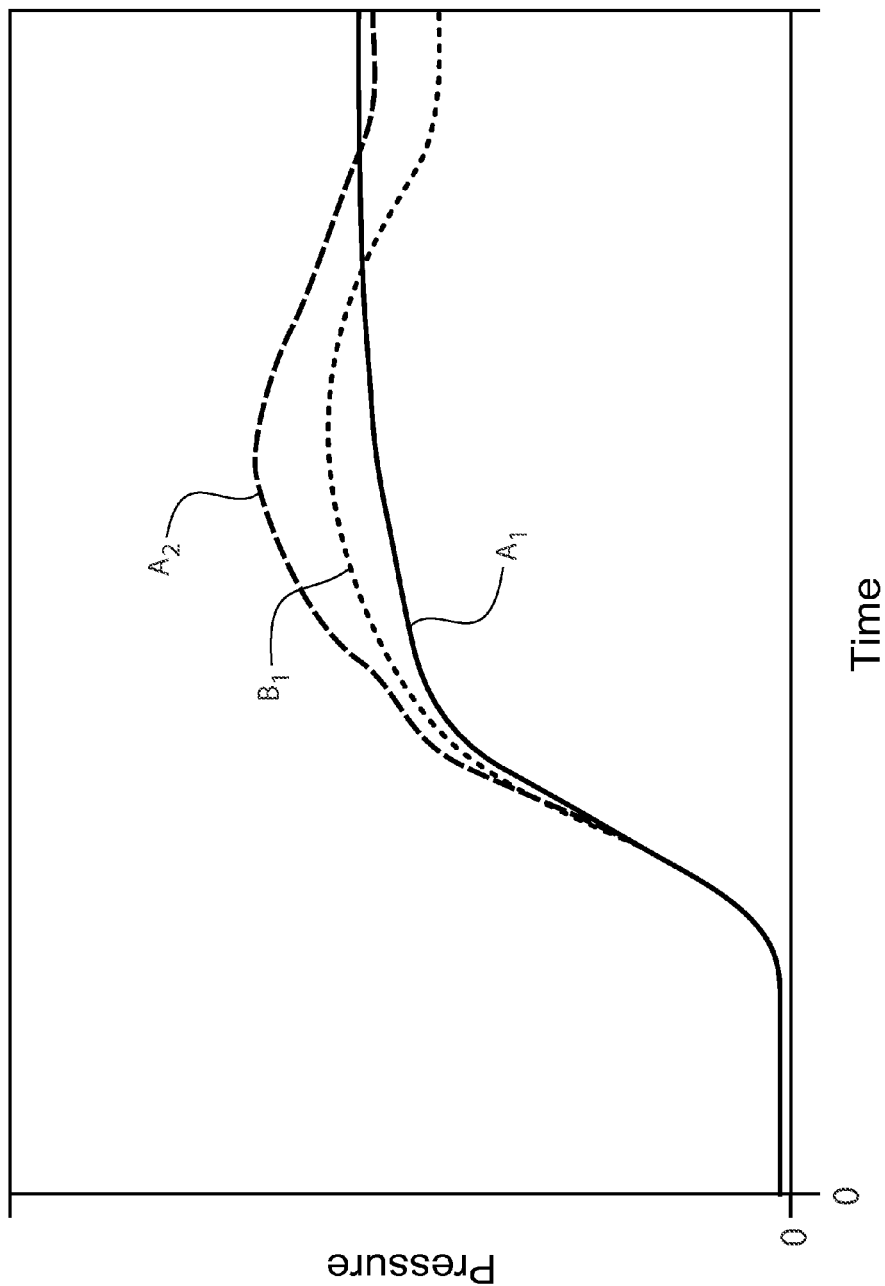
FIG. 8 is a graph depicting airbag pressure as a function of time.

FIG. 8 is a graph depicting airbag pressure as a function of time. An increased pressure can impact head or headform acceleration. Curve $A_1$ depicts the internal pressure of an unvented inflatable curtain airbag over time during deployment of the inflatable curtain airbag, which has not been struck by a headform of a crash test dummy. Curve $A_2$ depicts the internal pressure of the unvented inflatable curtain airbag of curve $A_1$ over a time in which the airbag has been struck by a headform of a crash test dummy during deployment. As shown in curve $A_2$, during a first impact pole event on the unvented inflatable curtain airbag, the internal pressure of the inflatable curtain airbag increased as the crash test dummy headform impacted the inflatable curtain airbag and decreased the volume of the inflatable curtain airbag. The headform impact depicted in curve $A_2$ can lead to a head acceleration curve that is parabolic or substantially parabolic. Curve $B_1$ depicts the predicted internal pressure of an unvented inflatable curtain airbag including tethered inflatable chambers, according to the present disclosure, over a time in which the airbag has been struck by a headform of a crash test dummy during deployment. As shown, the maximum internal pressure of the inflatable curtain airbag represented in curve $B_1$, which includes a tethered inflatable chamber, is less than the maximum internal pressure of the inflatable curtain airbag represented in curve $A_2$, which does not include a tethered inflatable chamber. The lower maximum pressure leads to a head acceleration curve that is more flat than is created by the curve $A_2$. In other words, the flatter curve $B_1$ reduces head acceleration as compared to curve $A_2$. Curve $B_1$ is achieved when an initial increase in the internal pressure of the inflatable curtain airbag, due to the headform impact, breaks some or all of the internal tethers. This increases the volume of the inflatable curtain airbag and lowers the overall internal pressure of the inflatable curtain airbag.

Figure 9:
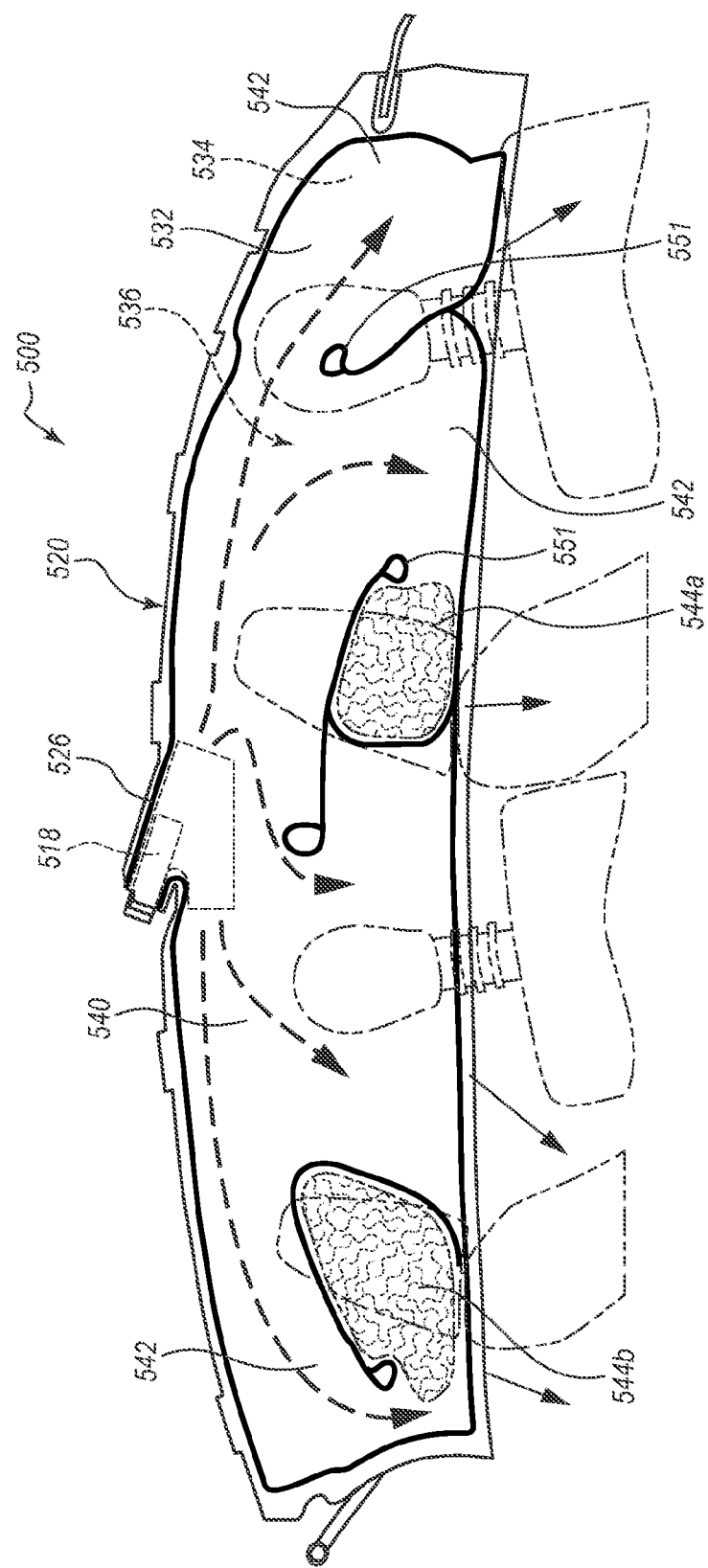
FIG. 9 is a side view of an inflatable curtain airbag assembly, according to another embodiment of the present disclosure, in a deployed state.

FIG. 9 is a side view of an inflatable curtain airbag assembly 500, according to yet another embodiment of the present disclosure, in a deployed state. As illustrated, the assembly 500 can include an inflator 518 and an inflatable curtain airbag 520 coupled to the inflator 518 at a throat portion 526.

The inflatable curtain airbag 520, as depicted, includes a front face 532 and a rear face 534 that can define a void 536 for receiving an inflation gas (i.e., from the inflator 518). In certain embodiments, the front face 532 and the rear face 534 may be formed from an airbag fabric as discussed above. As depicted, the inflatable curtain airbag 520 can also include a plurality of inflatable chambers 542, wherein the inflatable chambers 542 can be in fluid communication with the throat portion 526 (i.e., via a gas delivery channel 540 or another suitable gas delivery configuration). As discussed above, at least one of the inflatable chambers 542 may be, or may include, a tethered inflatable chamber. In the illustrated embodiment of FIG. 9, the inflatable curtain airbag 520 includes two tethered inflatable chambers 544a, 544b. In certain embodiments, the inflatable curtain airbag may include one, two, three, four, five, six, seven, or more tethered inflatable chambers. The tethered inflatable chambers 544a, 544b can include a plurality of internal tethers (not shown) disposed within the void 536. In some embodiments, the internal tethers can be configured to break when at least a portion of the inflatable curtain airbag 520 is struck by a vehicle occupant during a collision event. As described above, a breaking of a portion of the tethers allows greater expansion (i.e., increased volume) of the void 536 to lower maximum pressurization within the void 536 at occupant interaction. Lowering the maximum pressure within the void 536 can decrease occupant head acceleration.

As illustrated in FIG. 9, a first tethered inflatable chamber 544a can be disposed in a mid-portion of the inflatable curtain airbag 520, and a second tethered inflatable chamber 544b can be disposed in a rearward portion of the inflatable curtain airbag 520. One or more tethered inflatable chambers 544 can also or alternatively be disposed in other portions of the inflatable curtain airbag 520. For example, a tethered inflatable chamber 544 can be disposed in an upper portion, a lower portion, and/or a forward portion of the inflatable curtain airbag 520.

Each of the first and second tethered inflatable chambers 544a, 544b may be referred to as a delay-fill chamber or an extreme delay-fill chamber. In some embodiments, the delay-fill chamber may be incorporated into an inflatable curtain airbag to control or at least partially control head acceleration produced by the inflatable curtain airbag. A delay-fill chamber may at least partially control the head acceleration by providing internal venting that can effectively increase a volume of the inflatable curtain airbag when at least a portion of the inflatable curtain airbag is struck by a vehicle occupant. Incorporation of internal tethers within one or more inflatable chambers of an inflatable curtain airbag may reduce the volume of an inflatable curtain airbag. The tethered inflatable chambers may be disposed in one or more portions of an inflatable curtain airbag that may not need to be as inflated, or expanded as thick, upon deployment of the inflatable curtain airbag as other of the one or more other portions of the inflatable curtain airbag for desired performance of the inflatable curtain airbag.

In some embodiments, the internal tethers of the above-described tethered inflatable chambers may be configured or tuned to break at higher than normal operating pressure so that when the internal pressure of the inflatable curtain airbag increases due to impact with or being struck by a vehicle occupant, the tethered inflatable chambers may provide additional volume to reduce peak internal pressure of the inflatable curtain airbag. As such, an increase in a volume of the inflatable curtain airbag may be due to the inflatable curtain airbag being struck by a vehicle occupant rather than being due to a general inflatable curtain airbag deployment signal.

As can be appreciated, other methods of forming the one or more internal tethers are also within the scope of this disclosure. For example, the one or more internal tethers may be formed by sewing, gluing, and/or welding, etc. Specifically, using a cut, sealed, and sewn method, the one or more internal tethers may be sewn into an airbag and/or an inflatable chamber of an airbag and the one or more internal tethers may be sealed, pressed, cured, and/or further sewn (i.e., to the airbag and/or the inflatable chamber). In another example, the one or more internal tethers may be coupled to the airbag and/or the inflatable chamber via a sealant such as a glue.

Directional terms, such as "forward," "downward," "lower," etc., are used herein with respect to the orientation shown in the drawings and/or a vehicle utilizing the disclosed embodiments. The terms are used for the sake of convenience and are not necessarily intended to be limiting.

Much of the foregoing disclosure has focused on side curtain airbags configured to deploy lateral of a driver and/or a passenger seated in a front seat of a vehicle, or a passenger seated in a rear bench or seat of a vehicle. It should be understood that airbag features disclosed herein may be used with other types of airbags, as previously mentioned.

Any methods disclosed herein include one or more steps or actions for performing the described methods. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. An airbag, comprising:
    a front panel of fabric;
    a rear panel of fabric, the rear panel coupled to the front panel of fabric to define one or more inflatable chambers in fluid communication and for receiving inflation gas from an inflator; and
    one or more internal tethers disposed in a tethered inflatable chamber of the one or more inflatable chambers, the one or more internal tethers each comprising at least one of a warp yarn or a weft yarn that extends between the fabric of the front panel and the fabric of the rear panel,
    wherein the one or more internal tethers are configured to transition from an unbroken configuration to a broken configuration when an internal pressure in the tethered inflatable chamber exceeds a threshold.

2. The airbag of claim 1, wherein the fabric of the front panel and the rear panel is integrally formed by a one-piece weaving process.

3. The airbag of claim 1, wherein the at least one yarn of the one or more internal tethers is integral with each of the fabric of the front panel and the fabric of the rear panel.

4. The airbag of claim 1, wherein the tethered inflatable chamber comprises a plurality of internal tethers.

5. The airbag of claim 1, wherein the tethered inflatable chamber has a first volume when a majority of the one or more internal tethers are in the unbroken configuration and a second volume when a majority of the one or more internal tethers are in the broken configuration, and wherein the second volume is greater than the first volume.

6. The airbag of claim 1, wherein each of the one or more internal tethers comprises a set of multiple yarns.

7. The airbag of claim 1, wherein an internal distance between the front panel and the rear panel of the tethered inflatable chamber is configured to increase when substantially all of the one or more internal tethers transition from the unbroken configuration to the broken configuration.

8. The airbag of claim 7, wherein the internal distance is configured to at least double upon breaking of a majority of the one or more internal tethers.

9. The airbag of claim 1, further comprising one or more non-inflatable regions, wherein the one or more non-inflatable regions are disposed between at least two inflatable chambers.

10. The airbag of claim 9, wherein the one or more non-inflatable regions are formed as a single, woven airbag fabric layer.

11. An inflatable curtain airbag assembly, comprising:
an inflator; and
an inflatable curtain airbag coupled to the inflator, the inflatable curtain airbag comprising:
a front face and a rear face defining a void for receiving an inflation gas from the inflator, wherein each of the front face and the rear face is formed from an airbag fabric;
a throat portion in fluid communication with the inflator;
a plurality of inflatable chambers in fluid communication with the throat portion, wherein at least one of the inflatable chambers is a tethered inflatable chamber comprising a plurality of internal tethers disposed within the void, wherein each of the internal tethers comprises a yarn, the yarn extending between the airbag fabric of the front face and the airbag fabric of the rear face, wherein the internal tethers are configured to break into two discrete internal tether portions when an internal pressure of the tethered inflatable chamber reaches a predetermined value.

12. The assembly of claim 11, wherein the inflatable curtain airbag comprises at least two tethered inflatable chambers, and wherein the internal tethers are configured to break when at least a portion of the inflatable curtain airbag is struck by a vehicle occupant during a collision event.

13. The assembly of claim 12, wherein the inflatable curtain airbag has a longitudinal orientation, wherein a first tethered inflatable chamber is disposed in a forward portion of the inflatable curtain airbag, and wherein a second tethered inflatable chamber is disposed in a mid-portion of the inflatable curtain airbag.

14. The assembly of claim 11, wherein the yarn of the plurality of internal tethers is integral with the airbag fabric of the front face and the airbag fabric of the rear face.

15. The assembly of claim 11, wherein the tethered inflatable chamber has a first volume when a majority of the internal tethers are intact and a second volume when a majority of the internal tethers are broken, and wherein the second volume is greater than the first volume.

16. The assembly of claim 11, wherein an internal distance between the front face and the rear face of the tethered inflatable chamber is configured to increase when a majority of the internal tethers break.

17. The assembly of claim 11, further comprising one or more non-inflatable regions, wherein the one or more non-inflatable regions are disposed between at least two inflatable chambers.

18. The assembly of claim 17, wherein the one or more non-inflatable regions are formed as a single, woven airbag fabric layer.

19. A method of weaving an airbag, comprising:
forming a first woven fabric layer via a first weaving pattern comprising weaving a first set of warp yarns under a first adjacent weft yarn, weaving a third set of warp yarns over the first adjacent weft yarn, alternately weaving the first set of warp yarns over a second adjacent weft yarn and alternately weaving the third set of warp yarns under the second adjacent weft yarn, and then repeatedly weaving and alternately weaving the first set of warp yarns and the third set of warp yarns, substantially laterally, with respect to additional weft yarns;
forming a second woven fabric layer via a second weaving pattern comprising weaving a second set of warp yarns under a third adjacent weft yarn, weaving a fourth set of warp yarns over the third adjacent weft yarn, alternately weaving the second set of warp yarns over a fourth adjacent weft yarn and alternately weaving the fourth set of warp yarns under the fourth adjacent weft yarn, and then repeatedly weaving and alternately weaving the second set of warp yarns and the fourth set of warp yarns, substantially laterally, with respect to additional weft yarns;
forming an internal tether between the first woven fabric layer and the second woven fabric layer via a third weaving pattern comprising releasing at least a portion of at least one weft yarn of the first woven fabric layer, and weaving at least a portion of the at least one weft yarn of the first woven fabric layer into the second woven fabric layer to form the internal tether, wherein the internal tether has a length, and wherein the internal tether is configured to break when an internal pressure within the tethered inflatable chamber in which the internal tether is disposed reaches a predetermined level;
wherein a portion of the first woven fabric layer is opposite from and spaced apart from a portion of the second woven fabric layer;
wherein the first woven fabric layer and the second woven fabric layer define an inflatable fabric portion that is surrounded by a non-inflatable fabric portion;
wherein the first woven layer and the second woven layer define at least one tethered inflatable chamber within the inflatable fabric portion, the tethered inflatable chamber comprising the internal tether; and
wherein the first woven fabric layer and the second woven fabric layer are woven to form a single continuous piece of fabric for use in inflatable airbags.

20. The method of claim 19, wherein an internal distance between each of the first woven fabric layer and the second woven fabric layer of the tethered inflatable chamber is configured to at least double upon breaking of the internal tether, when the inflatable chamber is in an inflated configuration.

21. The method of claim 19, further comprising forming a plurality of internal tethers between the first woven fabric layer and the second woven fabric layer, the plurality of internal tethers including the internal tether.

22. The method of claim 21, wherein the at least one tethered inflatable chamber has a first volume when a majority of the plurality of internal tethers are in the unbroken configuration and a second volume when a majority of the plurality of internal tethers are in the broken configuration, and wherein the second volume is greater than the first volume.

* * * * *